(12) United States Patent  
Fukutome et al.

(10) Patent No.: US 9,417,475 B2  
(45) Date of Patent: Aug. 16, 2016

(54) DISPLAY DEVICE

(71) Applicant: Semiconductor Energy Laboratory Co., Ltd., Atsugi-shi, Kanagawa-ken (JP)

(72) Inventors: Takahiro Fukutome, Tochigi (JP); Toru Tanabe, Taito (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/184,977

(22) Filed: Feb. 20, 2014

(65) Prior Publication Data

US 2014/0240617 A1    Aug. 28, 2014

(30) Foreign Application Priority Data

Feb. 22, 2013  (JP) ................... 2013-032751

(51) Int. Cl.
| | |
|---|---|
| G02F 1/136 | (2006.01) |
| G02F 1/1333 | (2006.01) |
| G02F 1/1362 | (2006.01) |
| G06F 3/041 | (2006.01) |
| G06F 3/044 | (2006.01) |

(52) U.S. Cl.  
CPC ...... *G02F 1/13338* (2013.01); *G02F 1/136209* (2013.01); *G06F 3/044* (2013.01); *G06F 3/0412* (2013.01); *G02F 2001/136222* (2013.01); *G06F 2203/04103* (2013.01)

(58) Field of Classification Search  
CPC .......... G02F 1/13338; G02F 1/136209; G06F 3/0412; G06F 3/044  
See application file for complete search history.

(56) References Cited

U.S. PATENT DOCUMENTS

| | | | |
|---|---|---|---|
| 5,327,001 A * | 7/1994 | Wakai | G02F 1/136209 257/350 |
| 7,821,606 B2 | 10/2010 | Ogino | |
| 7,859,521 B2 | 12/2010 | Hotelling et al. | |
| 7,995,041 B2 | 8/2011 | Chang | |
| 8,217,913 B2 | 7/2012 | Hotelling et al. | |
| 8,363,027 B2 | 1/2013 | Hotelling et al. | |
| 8,502,799 B2 | 8/2013 | Hotelling et al. | |
| 8,767,150 B2 * | 7/2014 | Jeon | 349/110 |
| 2010/0134710 A1 * | 6/2010 | Ishitani et al. | 349/46 |
| 2012/0147284 A1 * | 6/2012 | Kim | G02F 1/133555 349/43 |
| 2013/0009909 A1 | 1/2013 | Yamazaki et al. | |
| 2013/0300953 A1 | 11/2013 | Hotelling et al. | |
| 2014/0192278 A1 * | 7/2014 | Esaka et al. | 349/12 |

FOREIGN PATENT DOCUMENTS

| | | |
|---|---|---|
| JP | 2008-129405 | 6/2008 |
| JP | 2010-231773 A | 10/2010 |

* cited by examiner

*Primary Examiner* — James Dudek  
(74) *Attorney, Agent, or Firm* — Robinson Intellectual Property Law Office; Eric J. Robinson

(57) ABSTRACT

A display device having a novel structure that can improve reliability is provided. It lowers reliability to form a structure by using a photomask, such as a color filter on a rear side of a substrate. With this display device, a transistor and the color filter is provided over a first substrate, a touch sensor is provided on a first surface of a second substrate, and the structure is not provided on a second surface of the second substrate. Consequently, the display device with the touch sensor can perform high reliability.

6 Claims, 28 Drawing Sheets

DISPLAY DEVICE

BACKGROUND OF THE INVENTION

1. Field of the Invention

The present invention relates to an object (a product including a machine, a manufacture, and a composition of matter) and a method (a process including a simple method and a production method). In particular, one embodiment of the present invention relates to a semiconductor device, a display device, a light-emitting device, a driving method thereof, or a manufacturing method thereof. One embodiment of the present invention particularly relates to, for example, a display device or a driving method thereof.

Note that the term "display device" means a device including a display element. A display device may include a driver circuit for driving a plurality of pixels, for example. Further, a display device or a display module may include a touch sensor, a control circuit, a power supply circuit, a signal generation circuit, or the like provided over a separate substrate.

2. Description of the Related Art

Commoditization of display devices, typified by liquid crystal display devices, has progressed as a result of recent technological innovation. This has increased proposals of high value-added products, such as a display device having a sensor function of sensing proximity or contact of an object (hereinafter referred to as touch sensor function).

For example, Patent Document 1 discloses a structure that reduces the thickness of a display device by providing, in addition to a display function, a touch sensor function using some of the wirings of the display device. In Patent Document 1, the display function and the touch sensor function are achieved by providing a display period and a touch sensing period separately.

REFERENCE

Patent Document

[Patent Document 1] Japanese Published Patent Application No. 2010-231773

SUMMARY OF THE INVENTION

Techniques for display devices include a technique of driving a display device at a frame frequency (also referred to as refresh rate) of higher than 60 Hz during moving image display to improve display quality. Also included is a technique of driving a display device at a frame frequency of 60 Hz or lower during still image display to reduce power consumption.

In the display device with a touch sensor function disclosed in Patent Document 1, an electrode of the touch sensor is provided on the element substrate side; accordingly, the touch sensing period is secured separately from the display period. If this structure is combined with a structure in which the display device operates with frame frequencies varied, for example, switched between a frequency of higher than 60 Hz and a frequency of 60 Hz or lower, time that can be spared for touch sensing is shortened, which makes it difficult to secure the touch sensing period.

Unlike the structure of the display device with a touch sensor function disclosed in Patent Document 1, it is possible to form the electrode of the touch sensor on a counter substrate facing the element substrate and provide a touch sensing period independently of a display period; however, this structure has a problem. Specifically, in this structure, the electrode of the touch sensor is formed on the front surface of the counter substrate and a structure such as a color filter is formed on the rear surface; thus, the counter substrate has structures formed by using photomasks on both the surfaces. On the counter substrate side, where structures formed by using photomasks are provided on both the surfaces, a problem such as a decrease in reliability is caused by impact during manufacture, for example. Although it is possible to solve this problem by employing a structure in which the electrode of the touch sensor is completely separate from the counter substrate, this structure makes the display device thick.

In view of the above, an object of one embodiment of the present invention is to provide a display device or the like having a novel structure that can secure a touch sensing period even in the case where frame frequencies are varied. Another object of one embodiment of the present invention is to provide a display device or the like having a novel structure that can improve reliability. Another object of one embodiment of the present invention is to provide a display device or the like having a novel structure that can reduce power consumption. Another object of one embodiment of the present invention is to provide a display device or the like having a novel structure that can increase yield. Another object of one embodiment of the present invention is to provide a display device or the like having a novel structure that can reduce the thickness of the display device or the like. Another object of one embodiment of the present invention is to provide a display device or the like having a novel structure that can reduce adverse effects of a trouble when a touch sensor is used. Another object of one embodiment of the present invention is to provide a display device or the like having a novel structure.

Note that the descriptions of these objects do not disturb the existence of other objects. In one embodiment of the present invention, there is no need to achieve all the objects. Objects other than the above objects will be apparent from and can be derived from the descriptions of the specification, the drawings, the claims, and the like.

In view of the above objects, in one embodiment of the present invention, a structure formed by using a photomask, such as a color filter, is provided in a display element portion on the first substrate side. Consequently, the rear surface of a second substrate does not have a structure formed by using a photomask, such as a color filter. With this structure, in a touch sensor portion including the second substrate, there is no possibility that forming an electrode of the touch sensor on one surface damages a structure on the other surface by contact or the like. In addition, in the case where display is performed with frame frequencies varied, a touch sensing period can be provided independently of a display period.

One embodiment of the present invention is a display device including a first substrate provided with a pixel including a transistor and a second substrate that faces the first substrate and is provided with a touch sensor on one surface. The first substrate is provided with a color filter.

Another embodiment of the present invention is a display device including a first substrate provided with a pixel including a transistor and a second substrate that faces the first substrate and is provided with a touch sensor on one surface. The first substrate is provided with a color filter. An alignment film is provided on the other surface of the second substrate.

Another embodiment of the present invention is a display device including a first substrate provided with a pixel including a transistor and a second substrate that faces the first substrate and is provided with a touch sensor on one surface. The first substrate is provided with a color filter and a black matrix.

Another embodiment of the present invention is a display device including a first substrate provided with a pixel including a transistor and a second substrate that faces the first substrate and is provided with a touch sensor on one surface. The first substrate is provided with a color filter and a black matrix. An alignment film is provided on the other surface of the second substrate.

In the display device of one embodiment of the present invention, the transistor preferably includes a semiconductor layer including an oxide semiconductor.

Another embodiment of the present invention is an electronic device including any of the above display devices.

In one embodiment of the present invention, a display device having a novel structure that can secure a touch sensing period even in the case where frame frequencies are varied can be provided. Further, in one embodiment of the present invention, a display device having a novel structure that can improve reliability can be provided.

DETAILED DESCRIPTION OF THE INVENTION

Figure 1A:
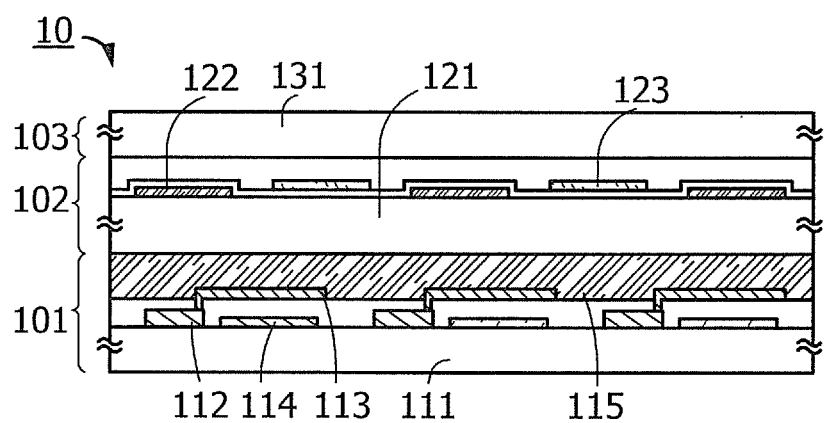
FIGS. 1A and 1B are schematic cross-sectional views of display devices.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments. Note that in structures of the invention described below, reference numerals denoting the same portions are used in common in different drawings.

In the drawings, the size, the layer thickness, or the region is exaggerated for clarity in some cases. Therefore, embodiments of the present invention are not limited to such scales. Note that the drawings are schematic views showing ideal examples, and embodiments of the present invention are not limited to shapes or values shown in the drawings. For example, the following can be included: variation in signal, voltage, or current due to noise or difference in timing.

In this specification and the like, a transistor is an element having at least three terminals: a gate, a drain, and a source. The transistor includes a channel region between the drain (a drain terminal, a drain region, or a drain electrode) and the source (a source terminal, a source region, or a source electrode) and current can flow through the drain, the channel region, and the source.

Here, since the source and the drain of the transistor change depending on the structure, the operating condition, and the like of the transistor, it is difficult to define which is a source or a drain. Thus, a portion that functions as a source or a portion that functions as a drain is not referred to as a source or a drain in some cases. In that case, one of the source and the drain might be referred to as a first electrode, and the other of the source and the drain might be referred to as a second electrode.

Note that in this specification, ordinal numbers such as "first", "second", and "third" are used in order to avoid confusion among components, and thus do not limit the number of the components.

Note that in this specification, when it is described that "A and B are connected to each other", the case where A and B are electrically connected to each other is included in addition to the case where A and B are directly connected to each other. Here, the description "A and B are electrically connected to each other" means the following case: when an object having any electrical function exists between A and B, an electric signal can be transmitted and received between A and B.

Note that in this specification, terms for describing arrangement, such as "over" and "under", are used for convenience for describing the positional relation between components with reference to drawings. Further, the positional relation between components is changed as appropriate in accordance with a direction in which each component is described. Thus, the positional relation is not limited to that described with a term used in this specification and can be explained with another term as appropriate depending on the situation.

Note that the layout of circuit blocks in a block diagram in a drawing specifies the positional relation for description. Thus, even when a drawing shows that different functions are achieved in different circuit blocks, an actual circuit or region may be configured so that the different functions are achieved in the same circuit or region. Further, a function of each circuit block in a block diagram in a drawing is specified for description. Thus, even when one circuit block is illustrated, an actual circuit or region may be configured so that processing which is illustrated as being performed in the one circuit block is performed in a plurality of circuit blocks.

In this specification, embodiments of the present invention will be described with reference to the drawings. Embodiments are described in the following order:
1. Embodiment 1 (Basic structure relating to one embodiment of the present invention);
2. Embodiment 2 (Structural example of liquid crystal display device);
3. Embodiment 3 (Structural example of EL display device);
4. Embodiment 4 (Other components of display device);
5. Embodiment 5 (Operation of display device);
6. Embodiment 6 (Block diagram of display device); and
7. Embodiment 7 (Structural examples of display module and electronic device including the display module).

Embodiment 1

In this embodiment, a display device of one embodiment of the present invention will be described with reference to FIGS. 1A and 1B.

FIG. 1A is a schematic cross-sectional view showing, as an example, a liquid crystal display device 10 with a touch sensor function.

The liquid crystal display device 10 includes a display element portion 101 provided with transistors and a liquid crystal, a touch sensor portion 102 provided with a touch sensor, and a cover glass portion 103 that protects the touch sensor portion 102.

The display element portion 101 includes a substrate 111, a transistor 112, a conductive layer 113, and a color filter 114. The display element portion 101 includes a liquid crystal layer 115 over the conductive layer 113.

Examples of the substrate 111 include a glass substrate, a ceramic substrate, a quartz substrate, and a sapphire substrate. Pixels including transistors are provided over the substrate 111. Note that the substrate 111 may be provided with an optical film or a protective film, or may have an uneven surface. The substrate 111 is also referred to as a first substrate.

In the transistor 112, for example, an element included in a pixel, such as a capacitor, is provided in addition to a transistor. Note that the transistor may have a top-gate structure or a bottom-gate structure. The bottom-gate structure may be a channel-etched structure or a channel-protective structure. The transistor may have a coplanar structure or a staggered structure. The transistor may have a double-gate structure with a back gate or a multi-gate structure with multiple gates.

The conductive layer 113 is used as a pixel electrode of a liquid crystal element, for example. The conductive layer 113 also can serve as a wiring led out to make electrical connection between wirings formed in different layers. As an example of the conductive layer 113, a film of indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or the like can be used.

The color filter 114 is a coloring layer that absorbs part of irradiation light so that light of a desired color is extracted. For example, a "red color filter" is a coloring layer that absorbs part of light entering the coloring layer so that light in a red wavelength range is extracted. The color filter 114 is formed in a desired position with any of a variety of materials by a printing method, an inkjet method, an etching method using a photolithography technique, or the like.

Note that an overcoat layer may be provided over the color filter 114. The overcoat layer has a function of protecting the color filter. The overcoat layer can be, for example, an insulating layer of an acrylic-based resin or the like.

An electric field is applied between a pair of electrodes to control transmission or non-transmission of light of the liquid crystal layer 115 by an optical modulation action of a liquid crystal. The optical modulation action of a liquid crystal is controlled by an electric field applied to the liquid crystal (including a lateral electric field, a vertical electric field, and a diagonal electric field).

Note that specific examples of the liquid crystal element include the following: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, and a banana-shaped liquid crystal. Note that a display element other than a liquid crystal element can be used. For example, an electrophoretic element or an electrochromic element used for electronic paper, or an electron emitter used for an FED or the like can be used. Alternatively, a micro electro mechanical system (MEMS) element, such as a digital micromirror device (DMD), a digital micro shutter (DMS), or an interferometric modulator (IMOD) element, can be used.

The touch sensor portion 102 includes a substrate 121, an electrode 122, and an electrode 123.

A substrate similar to the substrate 111 can be used as the substrate 121. Over the substrate 121, the electrodes 122 and 123 are provided with an insulating layer positioned therebetween. Note that the substrate 121 is also referred to as a second substrate.

A surface of the substrate 121 on which the electrodes 122 and 123 are provided is referred to as the front surface. It is preferable that the rear surface of the substrate 121 do not have a structure that is formed by using a photomask. For example, in the case where structures are formed by using photomasks on both the front and rear surfaces of the substrate 121, one surface serving as a support during formation of the structure on the other surface might be damaged by contact or the like, which lowers the reliability of the display device.

The electrodes 122 and 123 can be formed using a material similar to that for the conductive layer 113. Note that the electrodes 122 and 123 may be provided apart from each other in the same layer. Alternatively, the electrodes 122 and 123 may be in different layers with an insulating layer provided therebetween.

A pulse signal is applied to one of the electrodes 122 and 123 to generate a fringe electric field, and it can be determined whether there is touch on the basis of the fringe electric field. Specifically, a line of electric force formed by the fringe electric field between the electrodes 122 and 123 is blocked by touch, leading to a decrease in mutual capacitance. A change in current value at the other of the electrodes 122 and 123, which corresponds to the change in mutual capacitance, is used for determining whether there is touch.

The cover glass portion 103 includes a substrate 131.

As the substrate 131, a substrate similar to the substrates 111 and 121 can be used. It is particularly preferable that the substrate 131 have a mechanical strength as high as a Vickers hardness of approximately 650. For example, a tempered glass which has been subjected to physical or chemical treatment by an ion exchange method, a thermal tempering method, or the like and has a surface to which compressive stress has been applied is preferably used. Note that the substrate 131 is also referred to as a third substrate.

In the structure of this embodiment shown in FIG. 1A, a structure formed by using a photomask, such as a color filter, is provided in the display element portion 101 on the first substrate side. Accordingly, the rear surface of the substrate 121 does not have a structure formed by using a photomask, such as a color filter. With this structure shown in FIG. 1A, in a touch sensor portion 102 including the second substrate, there is no possibility that forming an electrode of the touch sensor on one surface damages a structure on the other surface by contact or the like. As a result, defects caused on the rear surface side when a structure is formed on the front surface can be reduced.

Note that the rear surface side of the substrate 121 may have an alignment film or a spacer that is formed without using a photomask.

Figure 1B:
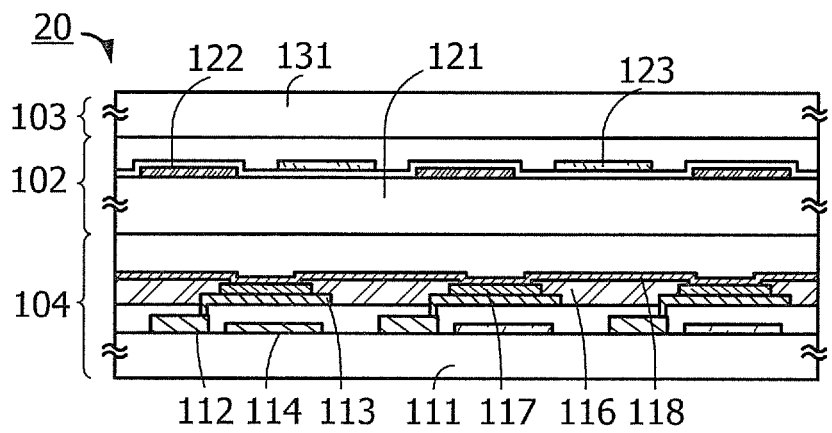

FIG. 1B is a schematic cross-sectional view showing, as an example, an electroluminescent (EL) display device 20 with a touch sensor function.

As in the liquid crystal display device 10, components of the EL display device 20 can be roughly classified into a display element portion 104, the touch sensor portion 102, and the cover glass portion 103.

The display element portion 104 includes the substrate 111, the transistor 112, the conductive layer 113, the color filter 114, a partition layer 116, a light-emitting layer 117, and a conductive layer 118.

In the EL display device 20 in FIG. 1B, light emitted from the light-emitting layer 117 is extracted from the substrate 111 side through the color filter 114. Accordingly, the touch sensor function of the EL display device 20 is performed on the side opposite to the display surface side.

In FIG. 1B, the conductive layer 113 is used as one of an anode and a cathode of an EL element, for example. Note that when used as an anode of an EL element, the conductive layer 113 is preferably formed using a metal, an alloy, a conductive compound, a mixture thereof, or the like with a high work function (specifically, 4.0 eV or higher). A specific example of a material for the conductive layer 113 is indium tin oxide.

The light-emitting layer 117 may be, for example, a single layer of a light-emitting layer, or multiple layers including a hole-transport layer, a hole-injection layer, an electron-transport layer, an electron-injection layer, or the like, in addition to the light-emitting layer. Further, the light-emitting layers 117 may be stacked.

The partition layer 116 is formed to cover the end portions of the conductive layer 113 so that adjacent pixels and wirings are insulated from each other. Note that the partition layer 116 is formed using an organic resin film, an inorganic insulating film, or organic polysiloxane. It is preferable that the partition layer 116 be formed to have an opening over the conductive layer 113 and a sidewall of the opening have a tilted surface with continuous curvature.

In FIG. 1B, the conductive layer 118 is used as the other of the anode and the cathode of the EL element, for example.

Note that when used as a cathode of an EL element, the conductive layer 118 is preferably formed using a metal, an alloy, a conductive compound, a mixture thereof, or the like with a low work function (specifically, 3.8 eV or lower). A specific example of a material for the conductive layer 118 is aluminum.

As is also described using FIG. 1A, the color filter is provided in the display element portion on the first substrate side in the structure of this embodiment shown in FIG. 1B. Accordingly, the rear surface of a second substrate does not have a structure formed by using a photomask, such as a color filter. With this structure shown in FIG. 1B, in a touch sensor portion including the second substrate, there is no possibility that forming an electrode of the touch sensor on one surface damages a structure on the other surface by contact or the like. As a result, defects caused on the rear surface side when a structure is formed on the front surface can be reduced.

In the above structures of this embodiment described using FIGS. 1A and 1B, the touch sensor is provided in the touch sensor portion on the second substrate side, and the color filter is provided in the display element portion on the first substrate side. Such a structure enables the touch sensor portion of the display device to be driven concurrently with the display element portion; thus, even in the case where frame frequencies are varied in the display element portion, a touch sensing period in the touch sensor portion can be secured.

Moreover, in the above structures of this embodiment described using FIGS. 1A and 1B, the touch sensor, which is formed by using a photomask, is provided on one surface of the second substrate, whereas a structure that is formed by using a photomask, such as an electrode, is not provided on the other surface of the second substrate. Therefore, in a touch sensor portion including the second substrate, there is no possibility that forming the touch sensor on one surface damages a structure on the other surface by contact or the like. As a result, defects caused on the rear surface side of the second substrate when a structure is formed on the front surface of the second substrate can be reduced, leading to an improvement in the reliability of the display device.

Embodiment 2

In this embodiment, a structure of a display device using a transverse electric field mode liquid crystal element (the device is also referred to as a liquid crystal display device) is specifically described as an example of the display device described in Embodiment 1. Since a liquid crystal display device of a transverse electric field mode can have a wider viewing angle than that of a vertical electric field mode, in recent years, liquid crystal display devices with a variety of screen sizes are used as display devices of mobile devices, and the like.

The liquid crystal display device refers to a device including a liquid crystal element. The liquid crystal display device may include a driver circuit for driving a plurality of pixels, for example. The liquid crystal display device may also include a touch sensor, a control circuit, a power supply circuit, a signal generation circuit, a backlight module, or the like provided over a separate substrate, and can be referred to as a liquid crystal module, a display module, or a module.

Typical examples of transverse electric field mode liquid crystal elements include an in-plane-switching (IPS) mode and a fringe field switching (FFS) mode. In this embodiment, a structure of an FFS mode liquid crystal display device will be described.

A liquid crystal display device of this embodiment is described with reference to FIG. 2, FIGS. 3A and 3B, FIGS.

4A and 4B, FIGS. 5A and 5B, FIGS. 6A to 6E, FIGS. 7A and 7B, FIG. 8, FIGS. 9A and 9B, FIGS. 10A and 10B, FIGS. 11A and 11B, and FIG. 12.

<Structure of Display Element Portion in Transverse Electric Field Mode Liquid Crystal Display Device>

Figure 2:
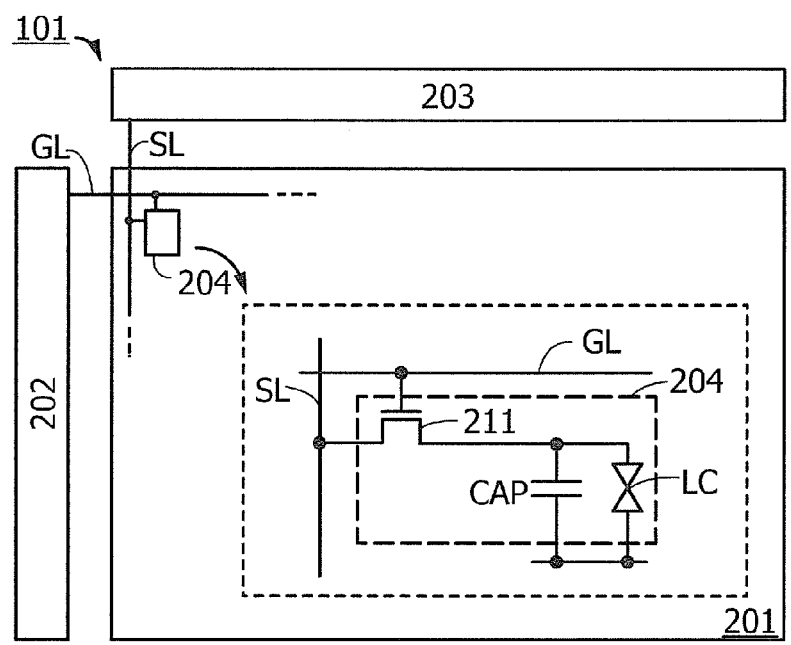
FIG. 2 is a circuit block diagram of a display element portion.

FIG. 2 is a circuit block diagram illustrating an example of the structure of the liquid crystal display device 10.

The circuit block diagram of the liquid crystal display device 10 in FIG. 2 shows a pixel portion 201, a gate driver 202, and a source driver 203. Further, FIG. 2 also shows a pixel 204 inside the pixel portion 201 and a circuit diagram of the pixel 204.

In the pixel portion 201, gate lines GL and source lines SL that are substantially perpendicular to the gate lines GL are provided. The pixel 204 is provided at the intersection of one of the gate lines and one of the source lines. In the case of color display, the pixels 204 corresponding to the respective colors of RGB are arranged in sequence in the pixel portion 201. Note that the pixels of RGB may be arranged in a stripe pattern, a mosaic pattern, a delta pattern, or the like as appropriate.

The gate driver 202 includes a shifter register or the like. The gate driver 202 receives a start pulse signal, a clock signal, or the like and outputs a pulse signal. The gate driver 202 has a function of controlling the potentials of the gate lines GL supplied with scan signals. Note that a plurality of gate drivers 202 may be provided to separately control the gate lines GL. Without being limited to the above, the gate driver 202 can supply another signal.

The source driver 203 includes a shift register or the like. The source driver 203 receives a signal (image signal) from which a data signal is generated, as well as a start pulse signal and a clock signal. The source driver 203 has a function of generating, on the basis of the image signal, a data signal to be written in the pixel portion 201. The source driver 203 also has a function of controlling the potentials of the source lines SL supplied with the data signals. Without being limited to such functions, the source driver 203 can have a function of supplying another signal.

The pixel 204 includes, for example, a transistor 211, a capacitor CAP, and a liquid crystal element LC.

The transistor 211 serves as a switching element for controlling the connection between the liquid crystal element LC and the source line SL. On/off of the transistor 211 is controlled by a scan signal supplied to a gate of the transistor 211 through the gate line GL.

The capacitor CAP is formed using a conductive layer serving as a pixel electrode and a conductive layer serving as a common electrode that are overlapped with each other, for example. In that case, a capacitor line does not need to be formed in the pixel 204.

The liquid crystal element LC includes the common electrode, the pixel electrode, and the liquid crystal layer, for example. Alignment of the liquid crystal material of the liquid crystal layer is changed by the action of an electric field generated between the common electrode and the pixel electrode.

Next, a structural example of the pixel 204 in FIG. 2 is described. FIG. 3A is a plan view of the structural example of the pixel and FIG. 3B is a cross-sectional view taken along the section line A1-A2 in FIG. 3A. FIG. 3B illustrates a cross section of the display element portion 101 in FIG. 1A; the touch sensor portion 102 and the cover glass portion 103 are omitted.

Figure 3A:
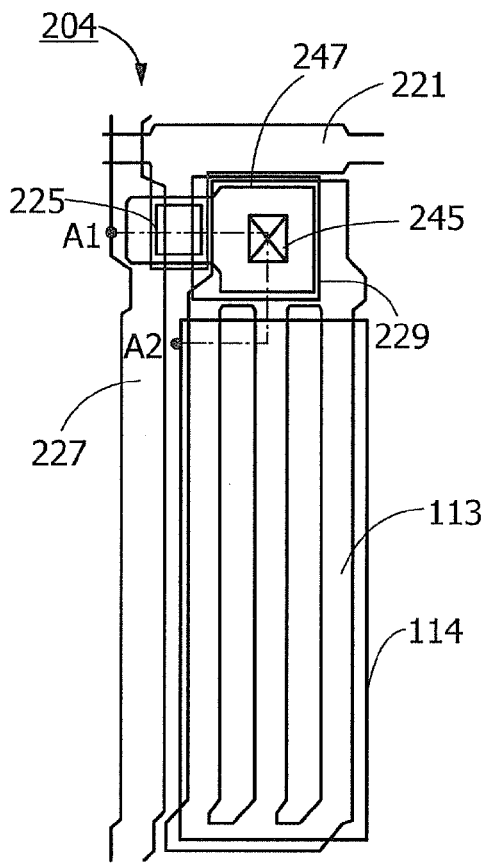
FIGS. 3A and 3B are a schematic plan view and a cross-sectional view of a display element portion.

The plan view of the pixel 204 in FIG. 3A shows, for example, a conductive layer 221, a conductive layer 227, a semiconductor layer 225, a conductive layer 229, the conductive layer 113, an opening 245, an opening 247, and the color filter 114.

Figure 3B:
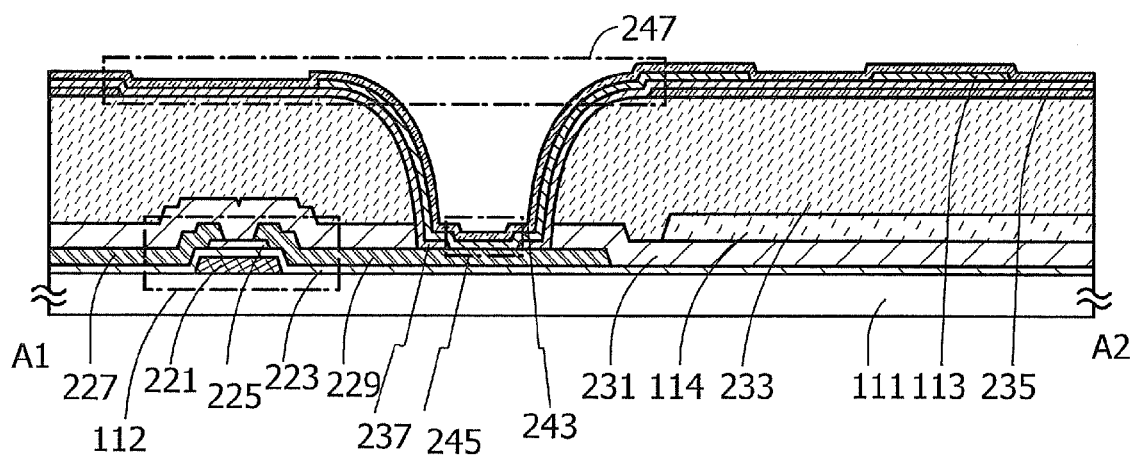

The cross-sectional view, along the section line A1-A2, of the pixel 204 in FIG. 3B shows, for example, the substrate 111, the conductive layer 221, an insulating layer 223, the semiconductor layer 225, the conductive layer 227, the conductive layer 229, an insulating layer 231, the color filter 114, an insulating layer 233, a conductive layer 235, the opening 245, an insulating layer 237, the conductive layer 113, an alignment film 243, and the opening 247. FIG. 3B also illustrates the transistor 112. Note that in FIG. 3B, a liquid crystal layer provided over the alignment film 243 is omitted.

The conductive layer 221 is a wiring serving as a gate line. The conductive layer 221 can serve as a gate electrode of the transistor 112. The conductive layer 221 can serve as a wiring supplied with a signal of a constant potential such as a high power supply potential VDD, a low power supply potential VSS, a ground potential, or a common potential. The conductive layer 221 can serve as a wiring led out to make electrical connection between wirings formed in different layers. As the conductive layer 221, a single layer or two or more layers of a film including a conductive material containing one or more kinds of aluminum, titanium, chromium, cobalt, nickel, copper, yttrium, zirconium, molybdenum, ruthenium, silver, tantalum, and tungsten are preferably formed.

The conductive layer 227 is a wiring serving as a source line. The conductive layer 227 can serve as one of a source and a drain of the transistor 112. The conductive layer 227 can serve as a wiring supplied with a signal of a constant potential such as the high power supply potential VDD, the low power supply potential VSS, the ground potential, or the common potential. In addition, the conductive layer 227 can serve as a wiring led out to make electrical connection between wirings formed in different layers. The conductive layer 227 can be formed in a manner similar to that of the conductive layer 221.

The semiconductor layer 225 is a layer with semiconductor characteristics. The layer with semiconductor characteristics can be a semiconductor layer mainly containing silicon (Si), a semiconductor layer mainly containing an organic material, or a semiconductor layer mainly containing a metal oxide. An example of the semiconductor layer mainly containing a metal oxide is an oxide semiconductor layer.

The conductive layer 229 serves as the other of the source and the drain of the transistor 112. The conductive layer 229 can serve as a wiring led out to make electrical connection between wirings formed in different layers. The conductive layer 229 can be formed in a manner similar to that of the conductive layer 221.

The conductive layer 235 is used as a common electrode of a liquid crystal element. The conductive layer 235 can serve as a wiring led out to make electrical connection between wirings formed in different layers. The conductive layer 235 can be formed in a manner similar to that of the conductive layer 113. Note that one of the conductive layer 113 and the conductive layer 235 has a comb-like shape and the other thereof has a planar shape.

In this embodiment, as the arrangement of the conductive layer 113 and the conductive layer 235, an example where the conductive layer 235 serving as a common electrode is placed below the conductive layer 113 serving as a pixel electrode (on the substrate 111 side) is illustrated, but the conductive layer 235 can be placed above the conductive layer 113.

The opening 245 is an opening for directly connecting the conductive layer 113 to the conductive layer 229. The opening 247, where the conductive layer 235 is removed, is an opening for directly connecting the conductive layer 113 to the conductive layer 229, and not to the conductive layer 235.

The insulating layer 223 serves as a gate insulating film of the transistor 112. The insulating layer 223, which has a single-layer structure or a stacked-layer structure, is formed using any of a silicon oxide film, a silicon oxynitride film, a silicon nitride oxide film, a silicon nitride film, an aluminum oxide film, and the like, for example.

Note that silicon nitride oxide refers to an insulating material that contains more nitrogen than oxygen, whereas silicon oxynitride refers to an insulating material that contains more oxygen than nitrogen.

The insulating layer 231 is formed using an insulating film of an inorganic material. In particular, the insulating layer 231 is preferably formed using a stack including an oxide film and a nitride film. The use of the nitride film for the insulating layer 231 can inhibit entry of impurities such as hydrogen and water into the semiconductor layer 225 from the outside. The insulating layer 231 can be a single layer or a stacked layer formed using an insulating film containing one or more of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide.

The insulating layer 233 is formed using an insulating film of an organic material. In particular, the insulating layer 233 preferably enables a layer or film to be formed thereover to be planarized. Heat-resistant organic materials such as an acrylic-based resin or a polyimide-based resin can be used for the insulating layer 233.

The insulating layer 237 is formed as a passivation film for preventing entry of water or an impurity from the outside. In addition, the insulating layer 237 serves as a dielectric of the capacitor formed in a region where the conductive layer 235 overlaps with the conductive layer 113. The insulating layer 237 is preferably an insulating film of a nitride or a nitride oxide and for example, a silicon nitride film or a silicon nitride oxide film can be formed.

The alignment film 243 is preferably a film imparting alignment to liquid crystal molecules in the liquid crystal layer.

In FIGS. 3A and 3B, the color filter 114 with an island shape is formed in a region of the pixel 204 where the opening 247 is not provided; however, another structure may be employed. For example, as in FIGS. 4A and 4B, a color filter (here, a color filter 114R) can be formed also in a region where the opening 247 is provided. In that case, the color filter 114R can be provided to partly overlap with a color filter 114G in the adjacent pixel at an end portion of the pixel 204.

Figure 4A:
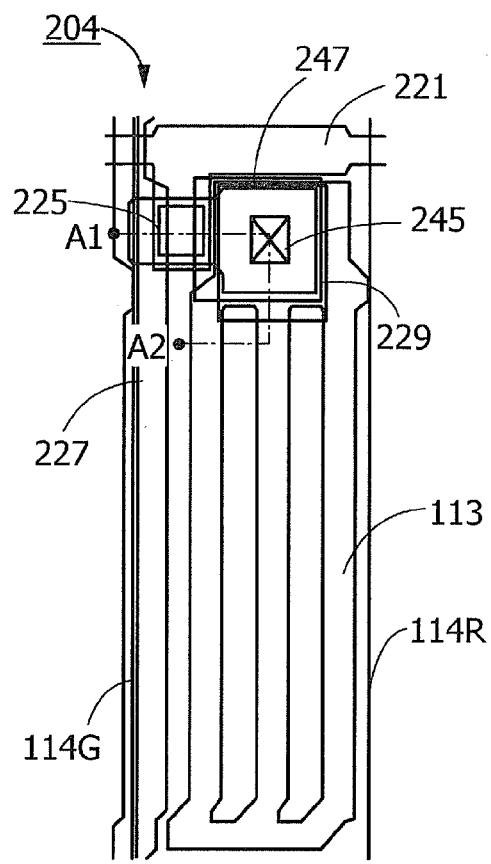
FIGS. 4A and 4B are a schematic plan view and a cross-sectional view of a display element portion.
Figure 4B:
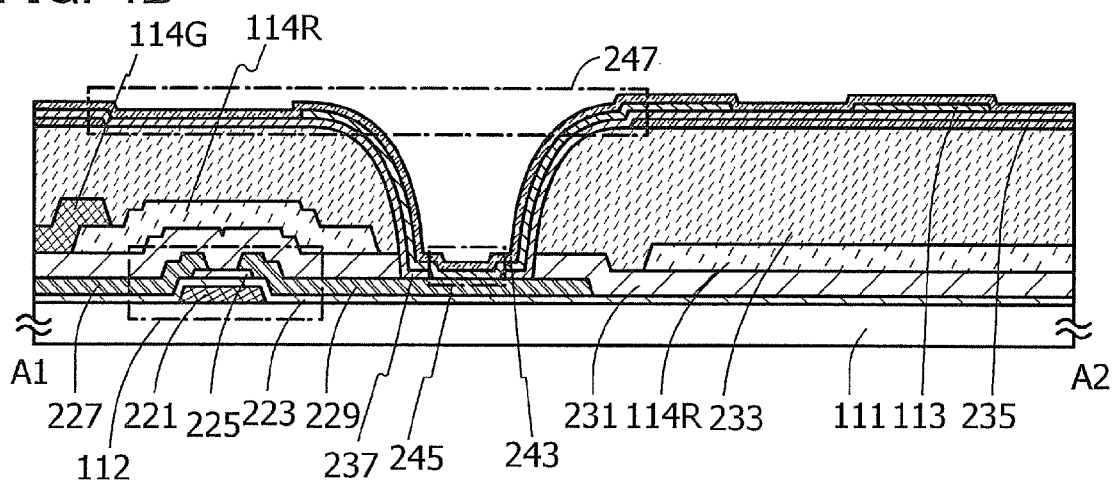

In the structure shown in FIGS. 4A and 4B, when color filters are arranged in a stripe pattern, misalignment of color filters in the direction in which color filters of the same color are arranged does not cause a defect in display operation.

Using the FFS mode, one of transverse electric field modes, for the display element portion including liquid crystal elements secures a wide viewing angle. In the FFS mode structure, a pixel electrode and a common electrode are formed using light-transmitting electrodes, which results in a high aperture ratio. Moreover, in the FFS mode structure, the light-transmitting electrodes are stacked; thus, storage capacitance can be secured without providing a capacitor line.

<Structure of Touch Sensor Portion in Transverse Electric Field Mode Liquid Crystal Display Device>

Figure 5A:
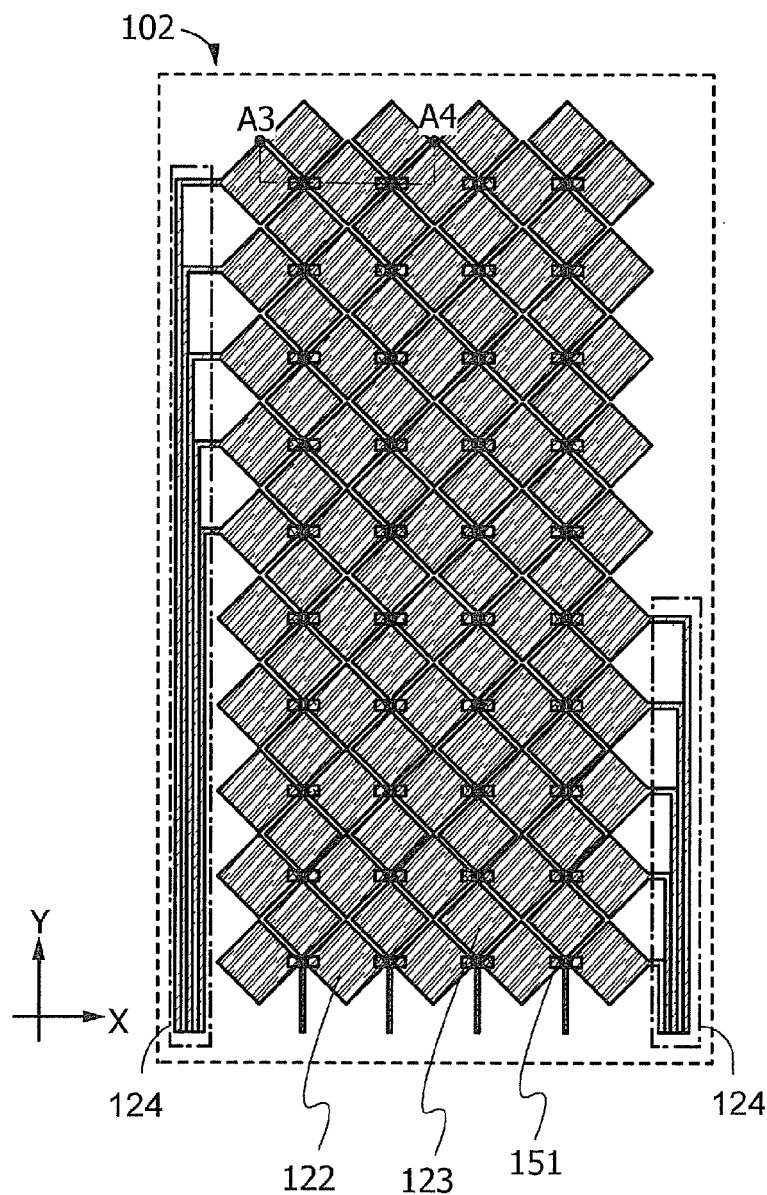
FIGS. 5A and 5B are a plan view and a cross-sectional view of a touch sensor portion.
Figure 5B:
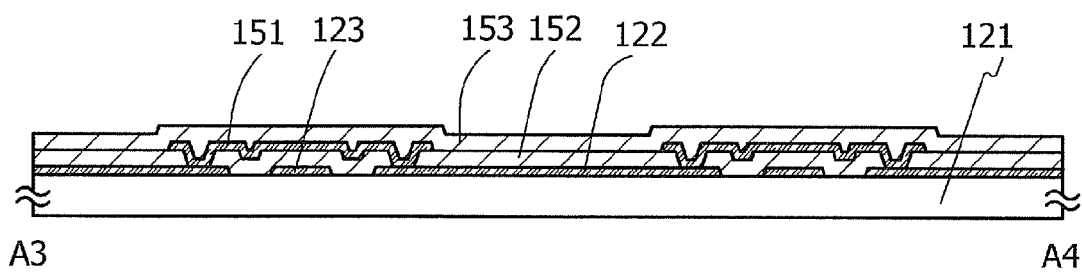

FIG. 5A is a plan view of the structural example of the touch sensor portion and FIG. 5B is a cross-sectional view taken along the section line A3-A4 in FIG. 5A. FIG. 5B illustrates a cross section of the touch sensor portion 102 in FIG. 1A; the display element portion 101 and the cover glass portion 103 are omitted. In this embodiment, a mutual capacitive touch sensor, which is particularly used for an external touch panel, is described as an example.

The plan view of the touch sensor portion 102 in FIG. 5A shows, for example, the electrodes 122 and 123, a conductive layer 124, and a conductive layer 151.

The cross-sectional view, along the section line A3-A4, of the touch sensor portion 102 in FIG. 5B shows, for example, the substrate 121, the electrodes 122 and 123, the conductive layer 151, an insulating layer 152, and an insulating layer 153. Note that in FIG. 5B, a bonding layer which is for bonding the touch sensor portion 102 and the substrate 131 of the cover glass portion 103 and which is provided over the insulating layer 153 is omitted.

The electrodes 122 extend in the X direction. The electrodes 123 extend in the Y direction. Each of the electrodes 122 and 123 can be formed in a manner similar to that of the conductive layer 113. Each of the electrodes 122 and 123 has a structure in which a plurality of quadrangular conductive films are connected to each other. The electrodes 122 and 123 are provided so that the quadrangular conductive films of the electrodes 122 and the quadrangular conductive films of the electrodes 123 do not overlap with each other.

The conductive layer 151 serves as a wiring for establishing electrical connection between the quadrangular conductive films of the electrode 122 to prevent a short-circuit between the electrode 122 extending in the X direction and the electrode 123 extending in the Y direction. The conductive layer 151 can be formed in a manner similar to that of the conductive layer 113.

The conductive layer 124 is connected to each of the electrodes 122 and 123 and serves as a wiring led out for exchanging electrical signals with an external circuit. The conductive layer 124 does not require a light-transmitting property because it is provided in a region which does not contribute to display, and thus can be formed using a material having a higher conductivity than the electrodes 122 and 123. The conductive layer 124 can be formed in a manner similar to that of the conductive layer 221.

The insulating layers 152 and 153 are provided to prevent a short-circuit between the electrode 122 extending in the X direction, the electrode 123 extending in the Y direction, and the conductive layer 151. Each of the insulating layers 152 and 153 can be formed in a manner similar to that of the insulating layer 231.

The touch sensor portion 102 in FIG. 1A is formed using the touch sensor used for an external touch panel; thus, the touch sensor portion 102 can have a touch sensing period concurrent with a display period. This makes it easy to secure the touch sensing period, which is difficult to secure in the case where refresh rates differ between during moving image display and during still image display.

Figure 6A:
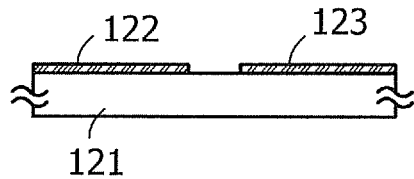
FIGS. 6A to 6E are schematic cross-sectional views of touch sensor portions.
Figure 6B:
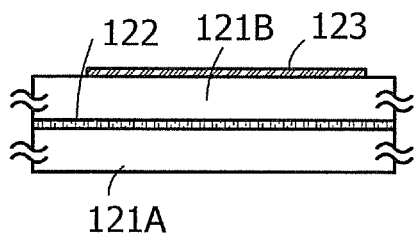
Figure 6C:
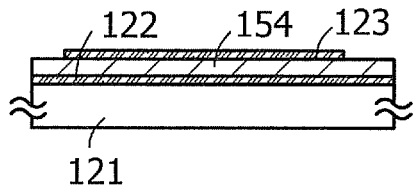
Figure 6D:
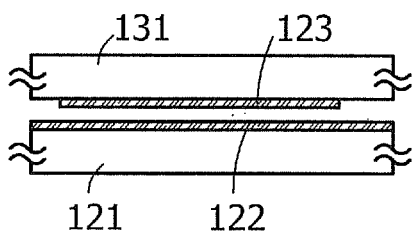
Figure 6E:
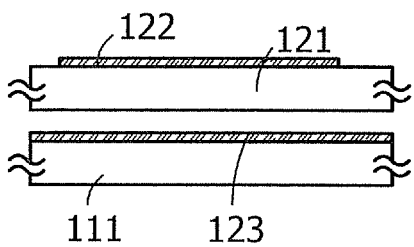

Note that the structure in the cross-sectional view in FIG. 5B can be schematically shown as in FIG. 6A. The schematic view in FIG. 6A illustrates the electrodes 122 and 123 over the substrate 121. A pulse signal is applied to one of the electrodes 122 and 123 to generate a fringe electric field, and it can be determined whether there is touch on the basis of the fringe electric field.

The structure of the touch sensor used for an external touch panel is not limited to that in FIG. 6A. For example, as in FIG. 6B, the electrode 122 can be provided between a substrate 121A and a substrate 121B, and the electrode 123 can be provided over the substrate 121B. For another example, as in FIG. 6C, the electrodes 122 and 123 can be provided over the substrate 121, and an insulating layer 154 can be provided between the electrodes 122 and 123. The structures in FIGS. 6B and 6C can increase the strength of the touch sensor and improve reliability.

Alternatively, one of the electrodes 122 and 123 in the touch sensor portion may be provided on another substrate. For example, as in FIG. 6D, the electrode 122 can be provided over the substrate 121, and the electrode 123 can be provided on the substrate 131. For another example, as in FIG. 6E, the electrode 122 can be provided over the substrate 121, and the electrode 123 can be provided between the substrate 111 and the substrate 121. With the structures in FIGS. 6D and 6E, the display device can be made thin, and the electrode 122 or the electrode 123 can serve not only as an electrode of a touch sensor but also as a common electrode or a shield electrode.

Figure 7A:
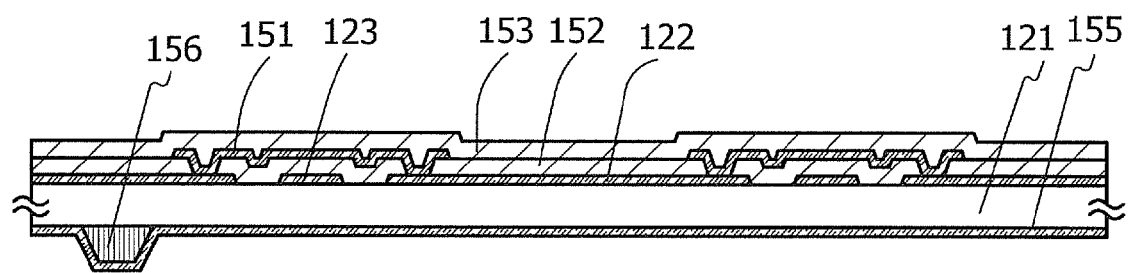
FIGS. 7A and 7B are cross-sectional views of touch sensor portions.

An alignment film and a spacer on the rear surface of the substrate 121 are not illustrated in the cross-sectional view in FIG. 5B. FIG. 7A illustrates, as an example, a cross-sectional view of a structure in which an alignment film 155 and a spacer 156 are provided.

The alignment film 155 and the spacer 156 do not require fine processing using a photomask. Therefore, the alignment film 155 and the spacer 156 can be formed after the electrodes 122 and 123 are formed over the substrate 121. Even when the electrode of the touch sensor is formed on one surface of the substrate 121 and then the alignment film 155 and the spacer 156 are formed on the other surface, the electrode of the touch sensor is not damaged by contact or the like because a fine structure is not formed on the other surface.

Similarly to the alignment film 243, the alignment film 155 is a film imparting alignment to liquid crystal molecules in the liquid crystal layer.

The spacer 156 maintains the cell gap. The cross section of the spacer 156 may be a rectangle or a circle. As a spacer with a circular cross section, a bead spacer can be used. In that case, the process can be simplified (e.g., a step for processing the spacer can be skipped).

Figure 7B:
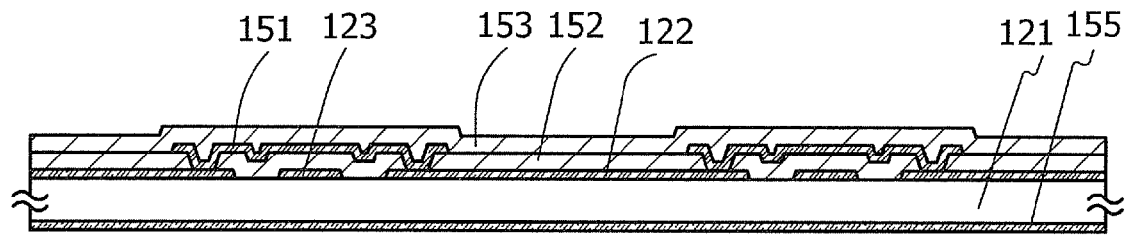

Note that the spacer 156 shown in FIG. 7A can be provided on the display element portion 101 side, and thus can be omitted as in FIG. 7B. In that case, the spacer can be formed by fine processing using a photomask.

In the structures of this embodiment described using FIGS. 5A and 5B, FIGS. 6A to 6E, and FIGS. 7A and 7B, the color filter is not provided on the second substrate including the touch sensor portion; that is, the rear surface of the second substrate does not have a structure formed by using a photomask, such as a color filter. With any of these structures, in the touch sensor portion, there is no possibility that forming an electrode of the touch sensor on one surface of the second substrate damages a structure on the other surface by contact or the like. As a result, defects caused on the rear surface side when a structure is formed on the front surface can be reduced.

The touch sensor is provided in the touch sensor portion on the second substrate side. Such a structure enables the touch sensor portion to be driven independently of the display element portion; thus, even in the case where frame frequencies are varied in the display element portion, a touch sensing period in the touch sensor portion can be secured.

<Cross-Sectional View of Combined Components of Transverse Electric Field Mode Liquid Crystal Display Device>

Figure 8:
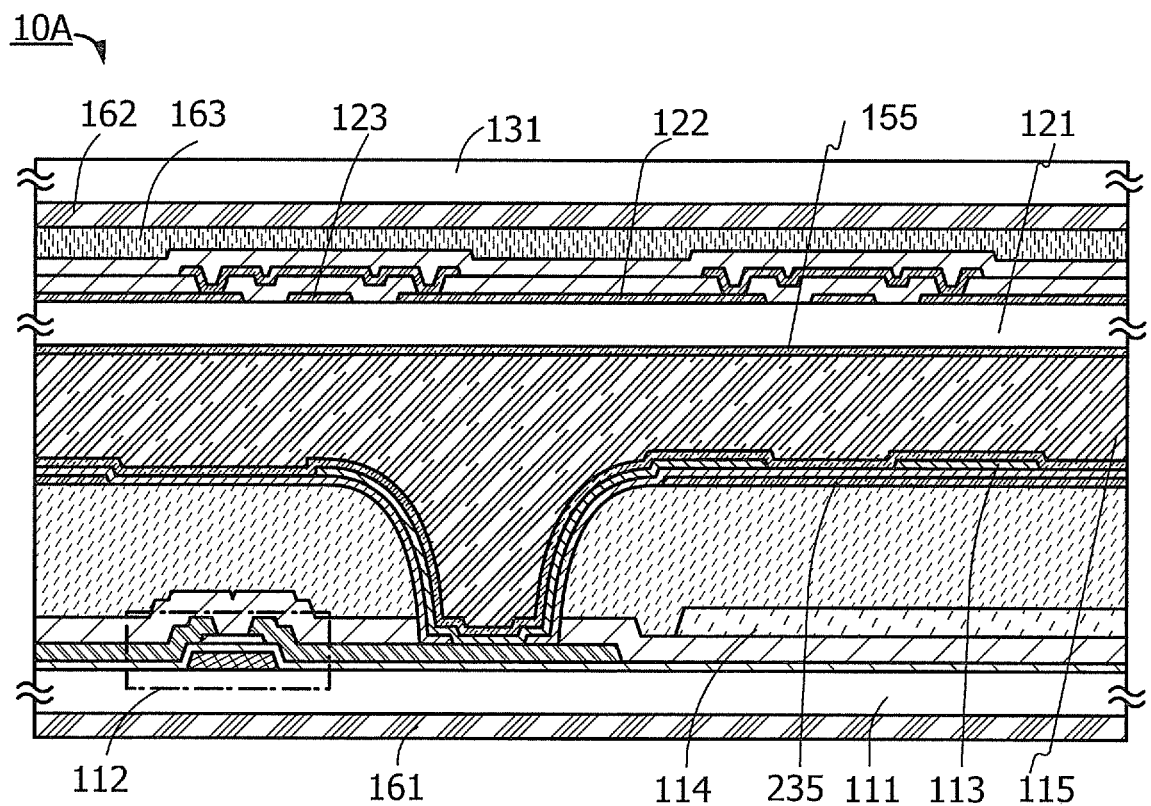
FIG. 8 is a cross-sectional view of a display device.

FIG. 8 is a cross-sectional view in which the cross-sectional view of the display element portion 101 (FIG. 3B) and the cross-sectional view of the touch sensor portion 102 (FIG. 5B) included in the above-described liquid crystal display device are combined. FIG. 8 also illustrates a cross-sectional view of the cover glass portion 103 and other components such as a polarizing plate.

The cross-sectional view in FIG. 8 illustrates a liquid crystal display device 10A including the substrate 111, the transistor 112, the conductive layer 113, the color filter 114, the liquid crystal layer 115, the alignment film 155, the conductive layer 235, the substrate 121, the electrodes 122 and 123, the substrate 131, a polarizing plate 161, a polarizing plate 162, and a bonding layer 163, for example.

There is no particular limitation on the polarizing plate 161 as long as it can produce linearly polarized light from natural light or circularly polarized light. For example, a polarizing plate whose optical anisotropy is obtained by disposing dichroic substances in one direction can be used. Such a polarizing plate can be formed in such a manner that an iodine-based compound or the like is adsorbed to a film such as a polyvinyl alcohol film and the film is stretched in one direction. Note that as the dichroic substance, a dye-based compound or the like as well as an iodine-based compound can be used. The same applies to the polarizing plate 162.

The bonding layer 163 is provided for bonding the touch sensor portion 102 and the cover glass portion 103. A double-sided adhesive sheet, an ultraviolet curable resin, or the like can be used for the bonding layer 163.

In FIG. 8, the polarizing plate 161 is provided in contact with the substrate 111 on the side opposite to the transistor 112 side, and the polarizing plate 162 is provided in contact with the substrate 131 on the electrodes 122 and 123 side; however, another structure may be employed.

Figure 9A:
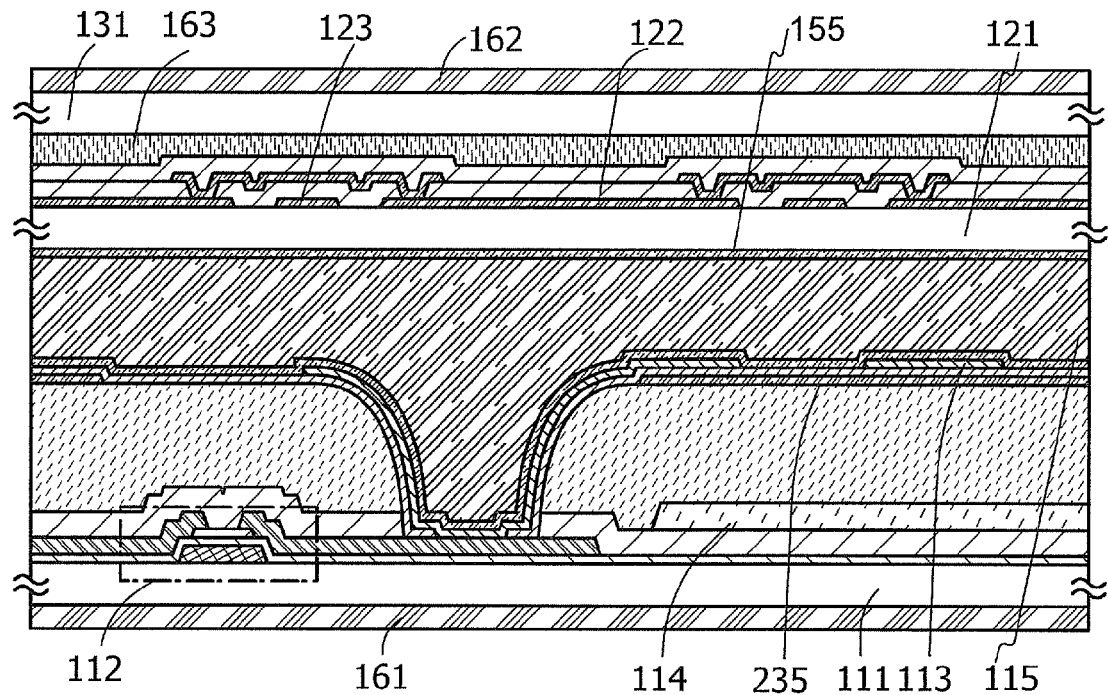
FIGS. 9A and 9B are cross-sectional views of display devices.

For example, as in FIG. 9A, the polarizing plate 161 can be provided in contact with the substrate 111 on the side opposite to the transistor 112 side, and the polarizing plate 162 can be provided in contact with the substrate 131 on the side opposite to the electrodes 122 and 123 side.

Figure 9B:
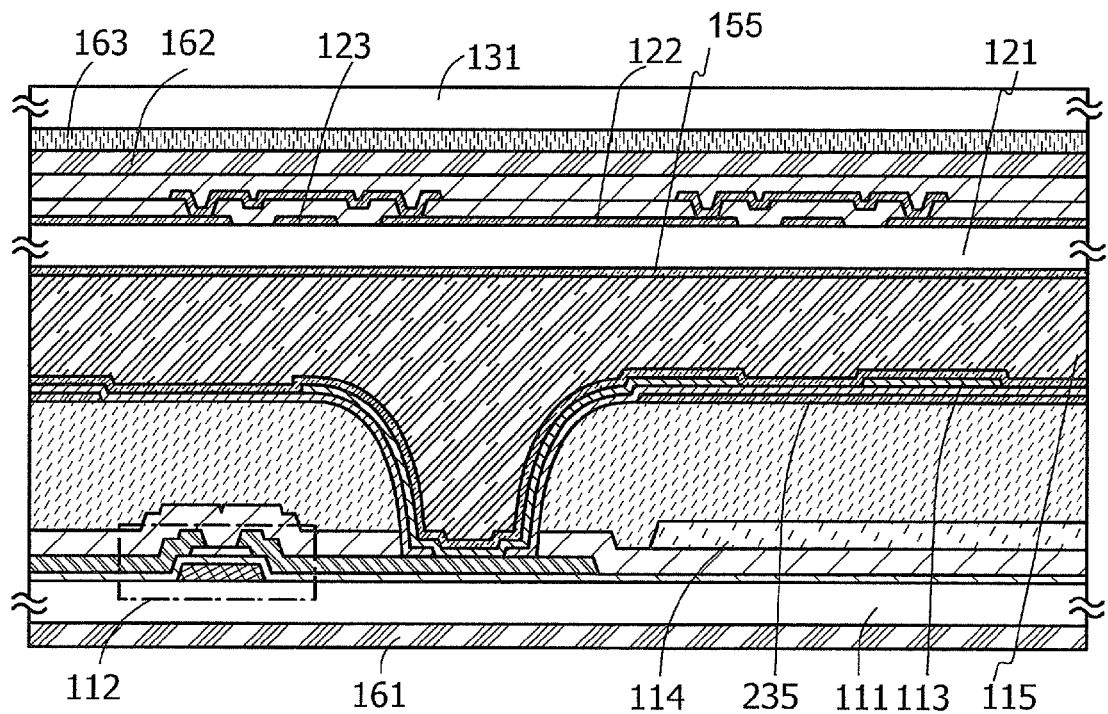

Alternatively, as in FIG. 9B, the polarizing plate 161 can be provided in contact with the substrate 111 on the side opposite to the transistor 112 side, and the polarizing plate 162 can be provided in contact with the bonding layer 163 on the electrodes 122 and 123 side.

Figure 10A:
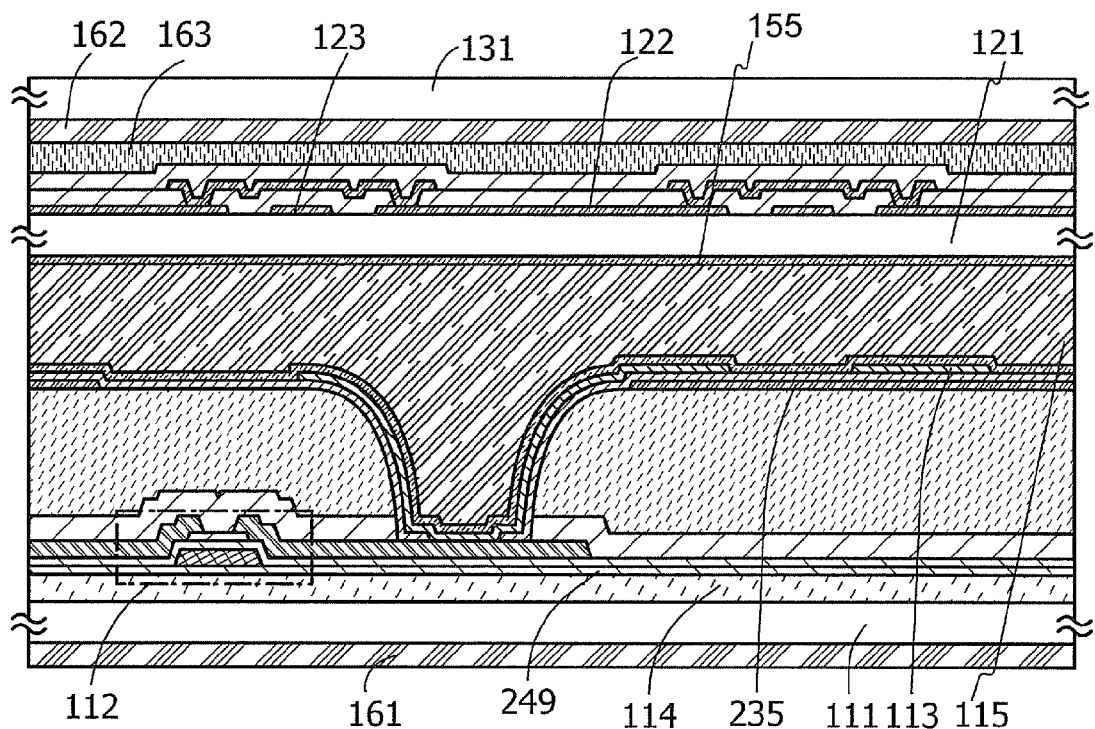
FIGS. 10A and 10B are cross-sectional views of display devices.

In FIG. 8, the color filter 114 is provided between the insulating layers in the display element portion; however, it is also possible to provide the color filter 114 in contact with the substrate 111 on the transistor 112 side, as shown in FIG. 10A. Note that when the color filter 114 is placed as in FIG. 10A, an insulating layer 249 is preferably provided between the transistor 112 and the color filter 114.

The insulating layer 249 serves as a base film of the transistor 112. The insulating layer 249, which has a single-layer structure or a stacked-layer structure, is formed using any of a silicon nitride oxide film, a silicon nitride film, an aluminum oxide film, a silicon oxide film, a silicon oxynitride film, and the like, for example.

Figure 10B:
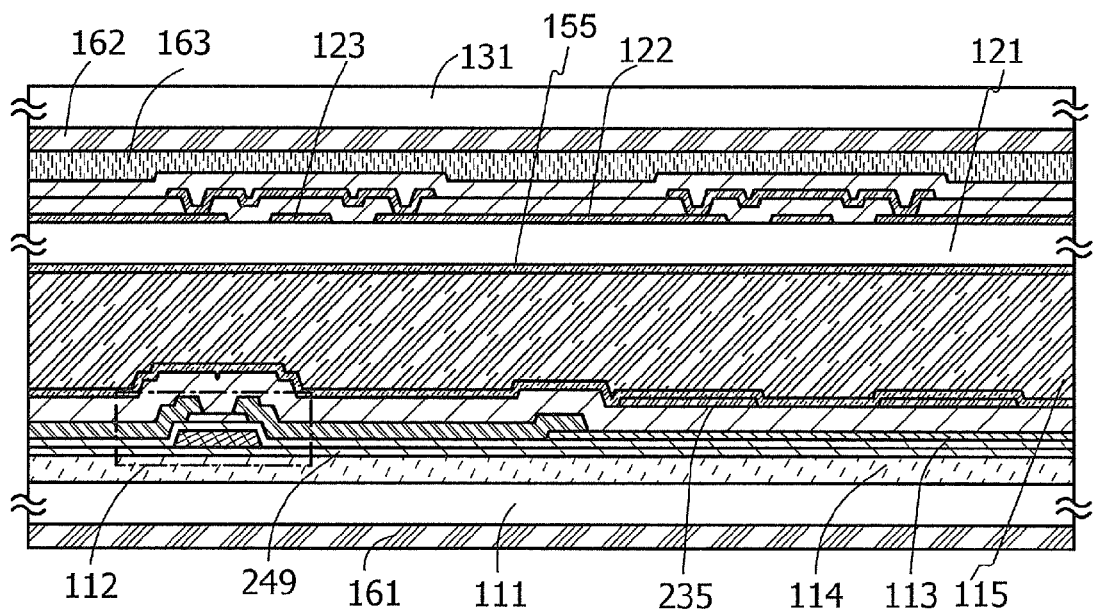

In the structure in FIG. 10A, the color filter 114 is not provided between the insulating layers in the display element portion; thus, the insulating layer 233 illustrated in FIG. 3B can be omitted, as shown in FIG. 10B.

In the above structures of this embodiment described using FIGS. 7A and 7B, FIG. 8, FIGS. 9A and 9B, and FIGS. 10A and 10B, the touch sensor is provided in the touch sensor portion on the second substrate side, and the color filter is provided in the display element portion on the first substrate side. Such a structure enables the touch sensor portion of the display device to be driven concurrently with the display element portion; thus, even in the case where frame frequencies are varied in the display element portion, a touch sensing period in the touch sensor portion can be secured.

Moreover, in the above structures of this embodiment described using FIGS. 7A and 7B, FIG. 8, FIGS. 9A and 9B, and FIGS. 10A and 10B, the touch sensor, which is formed by using a photomask, is provided on one surface of the second substrate, whereas a structure that is formed by using a photomask, such as an electrode, is not provided on the other surface of the second substrate. Therefore, in a touch sensor portion including the second substrate, there is no possibility that forming the touch sensor on one surface damages a structure on the other surface by contact or the like. As a result, defects caused on the rear surface side of the second substrate when a structure is formed on the front surface of the second substrate can be reduced, leading to an improvement in the reliability of the display device.

<Another Mode of Transverse Electric Field Mode Liquid Crystal Display Device>

Next, a display device of one embodiment of the present invention that includes a black matrix (light-blocking layer) in addition to a color filter is described.

Figure 11A:
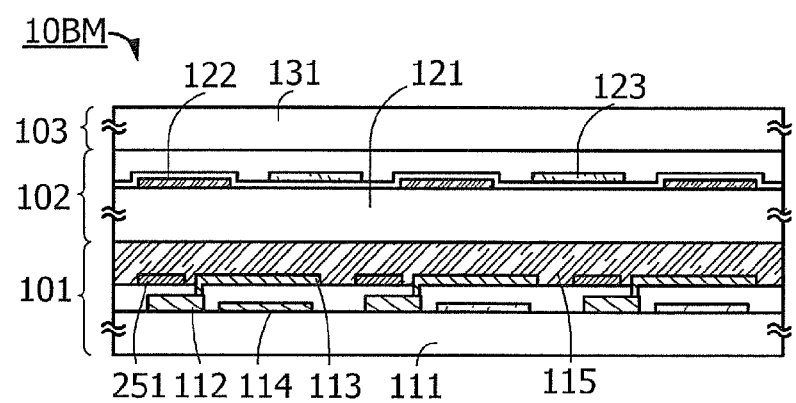
FIGS. 11A and 11B are cross-sectional views of a display device.

FIG. 11A is a schematic cross-sectional view showing, as an example, a liquid crystal display device 10BM with a touch sensor function.

The liquid crystal display device 10BM includes the display element portion 101 provided with transistors and a liquid crystal, the touch sensor portion 102 provided with a touch sensor, and the cover glass portion 103 that protects the touch sensor portion 102. The cross-sectional view in FIG. 11A differs from that in FIG. 1A in that a black matrix 251 is provided over the transistor 112.

The black matrix 251 is formed in a desired position with any of a variety of materials having a light-blocking property by a printing method, an inkjet method, an etching method using a photolithography technique, or the like, for example.

Note that the black matrix 251 may be formed using a material that has both a light-blocking property and conductivity. In that case, the block matrix 251 is formed using a metal film having a light-blocking property, such as an aluminum film. Since the black matrix 251 is formed over the transistor 112, the black matrix 251 can be used as a back-gate electrode. In that case, the black matrix 251 is provided to be electrically separated from the transistor 112.

Note that an overcoat layer may be provided over the black matrix 251. The overcoat layer has a function of protecting the black matrix. The overcoat layer can be, for example, an insulating layer of an acrylic-based resin or the like.

Figure 11B:
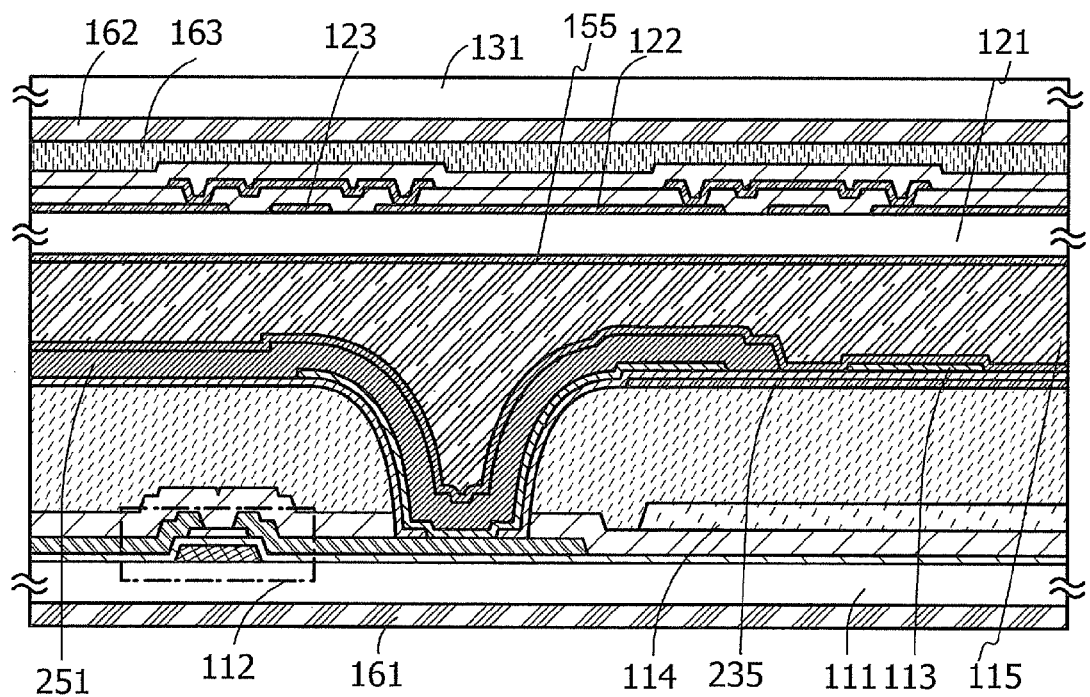

The cross-sectional view in FIG. 11B shows the liquid crystal display device 10BM in FIG. 11A. FIG. 11B shows, for example, the substrate 111, the transistor 112, the conductive layer 113, the color filter 114, the liquid crystal layer 115, the substrate 121, the electrodes 122 and 123, the substrate 131, the polarizing plate 161, the polarizing plate 162, the bonding layer 163, the conductive layer 235, and the black matrix 251.

Figure 12:
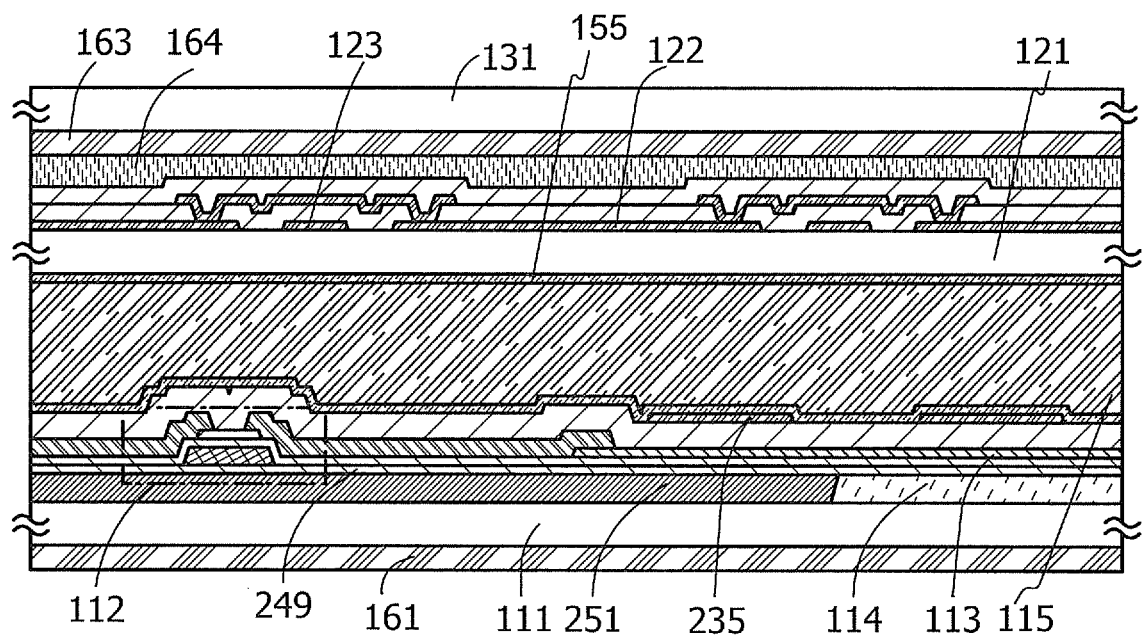
FIG. 12 is a cross-sectional view of a display device.

In FIG. 11B, the black matrix 251 is provided over the conductive layer 113 and the color filter 114 is provided between the insulating layers in the display element portion; however, it is also possible to provide the black matrix 251 and the color filter 114 in contact with the substrate 111 on the transistor 112 side, as shown in FIG. 12. When the black matrix 251 and the color filter 114 are placed as in FIG. 12, the insulating layer 249 is preferably provided between the transistor 112 and the black matrix 251 and between the transistor 112 and the color filter 114. Depending on the case or situation, one or both of the black matrix and the color filter can be omitted.

In the structure in FIG. 12, the color filter 114 is not provided between the insulating layers in the display element portion; thus, the insulating layer 233 illustrated in FIG. 3B can be omitted.

In the above structures of this embodiment described using FIGS. 11A and 11B and FIG. 12, the touch sensor is provided in the touch sensor portion on the second substrate side, and the color filter and the black matrix are provided in the display element portion on the first substrate side. Such a structure enables the touch sensor portion of the display device to be driven concurrently with the display element portion; thus, even in the case where frame frequencies are varied in the display element portion, a touch sensing period in the touch sensor portion can be secured.

Moreover, in the above structures of this embodiment described using FIGS. 11A and 11B and FIG. 12, the touch sensor, which is formed by using a photomask, is provided on one surface of the second substrate, whereas a structure that is formed by using a photomask, such as an electrode, is not provided on the other surface of the second substrate. Therefore, in a touch sensor portion including the second substrate, there is no possibility that forming the touch sensor on one surface damages a structure on the other surface by contact or the like. As a result, defects caused on the rear surface side of the second substrate when a structure is formed on the front surface of the second substrate can be reduced, leading to an improvement in the reliability of the display device.

This embodiment can be combined with any of the other embodiments in this specification as appropriate.

Embodiment 3

In this embodiment, a structure of an EL display device is specifically described as an example of the display device described in Embodiment 1. An EL display device does not require a backlight and can provide a wider viewing angle than a liquid crystal display device. For these reasons, in recent years, EL display devices with a variety of screen sizes are used as display devices of mobile devices and the like.

Note that an EL display device refers to a device including an EL element. The EL display device may include a driver circuit for driving a plurality of pixels, for example. The EL display device may also include a touch sensor, a control circuit, a power supply circuit, a signal generation circuit, or the like provided over a separate substrate, and can be referred to as an EL module, a display module, or a module.

As the EL element, an organic EL element, an inorganic EL element, or the like can be used. In this embodiment, an EL display device including an organic EL element is specifically described.

An EL display device of this embodiment will be described with reference to FIG. 13 and FIGS. 14A to 14C.

<Structure of Display Element Portion in EL Display Device>

Figure 13:
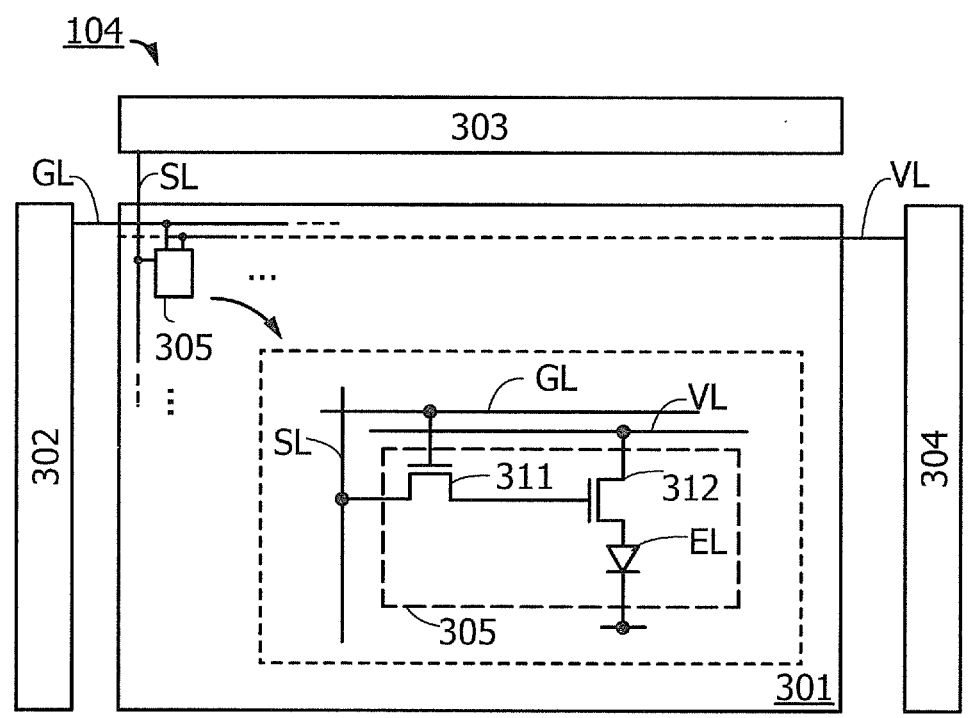
FIG. 13 is a circuit block diagram of a display element portion.

FIG. 13 is a circuit block diagram illustrating an example of the structure of the EL display device 20.

The circuit block diagram of the EL display device 20 in FIG. 13 shows a pixel portion 301, a gate driver 302, a source driver 303, and a power supply circuit 304. Further, FIG. 13 also shows a pixel 305 inside the pixel portion 301 and a circuit diagram of the pixel 305.

In the pixel portion 301, gate lines GL, power supply lines VL, and source lines SL that are substantially perpendicular to the gate lines GL and the power supply lines VL are provided. The pixel 305 is provided at the intersection of one of the gate lines GL, one of the power supply lines VL, and one of the source lines SL. In the case of color display, the pixels 305 corresponding to the respective colors of RGB are arranged in sequence in the pixel portion 301. Note that the pixels of RGB may be arranged in a stripe pattern, a mosaic pattern, a delta pattern, or the like as appropriate.

The gate driver 302 is similar to the gate driver 202 described in the above embodiment.

The source driver 303 is similar to the source driver 203 described in the above embodiment.

The power supply circuit 304 includes a voltage generation circuit for supplying voltage to the power supply lines VL, for example. Alternatively, the power supply circuit 304 may include a shift register for selectively supplying voltage to the power supply lines VL, for example. In that case, a start pulse signal and a clock signal are input to the power supply circuit 304 and the power supply circuit 304 selectively outputs signals to the power supply lines VL. The voltage levels of signals selectively output to the power supply lines VL are preferably switched between a voltage for supplying current to the EL element and a ground voltage. However, without being limited thereto, the power supply circuit 304 can supply another signal.

The pixel 305 includes, for example, a transistor 311, a transistor 312, and an EL element EL.

The transistor 311 serves as a switching element for controlling the connection between a gate of the transistor 312 and the source line SL. On/off of the transistor 311 is controlled by a scan signal supplied to a gate of the transistor 311 through the gate line GL.

The transistor 312 has a function of controlling current flowing between the power supply line VL and the EL element EL, in accordance with voltage applied to the gate of the transistor 312.

The EL element EL is, for example, an element including a light-emitting layer provided between electrodes. The luminance of the EL element EL can be controlled by the amount of current that flows in the light-emitting layer.

Figure 14A:
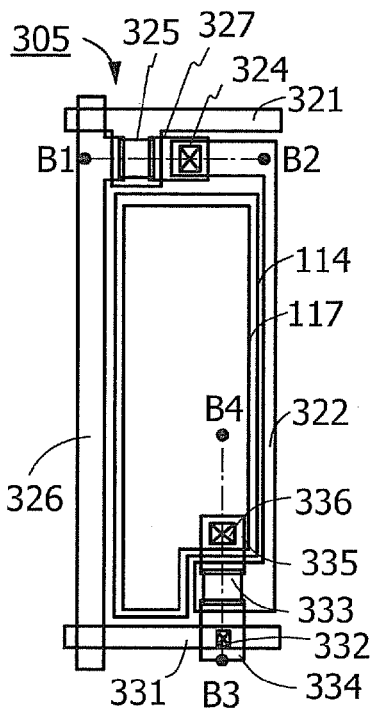
FIGS. 14A to 14C are a schematic plan view and cross-sectional views of a display element portion.
Figure 14B:
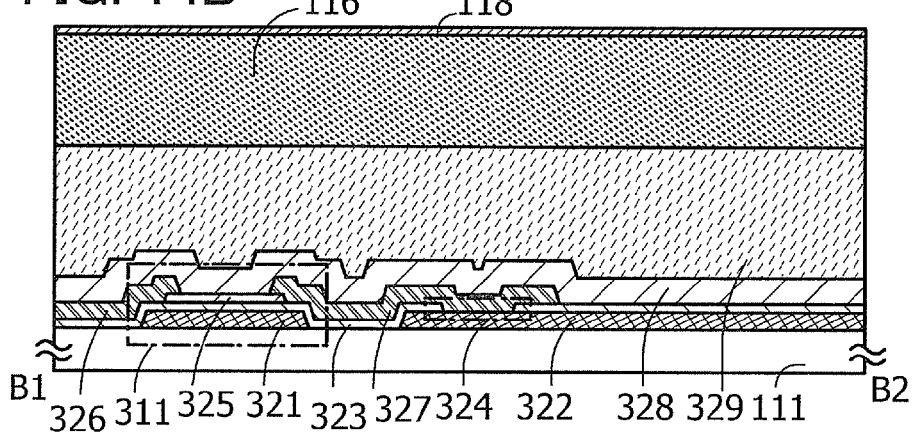
Figure 14C:
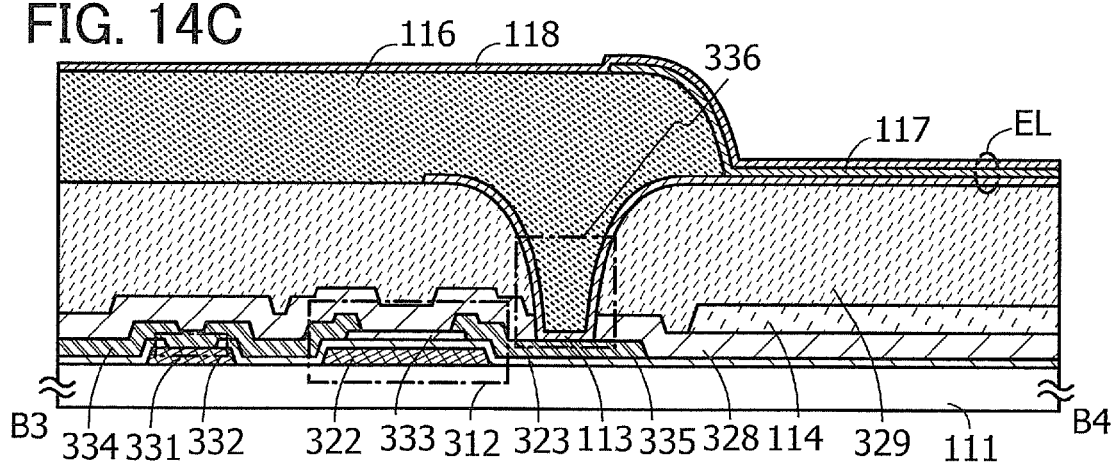

Next, a structural example of the pixel 305 in FIG. 13 is described. FIG. 14A is a plan view of the structural example of the pixel. FIG. 14B is a cross-sectional view taken along the section line B1-B2 in FIG. 14A. FIG. 14C is a cross-sectional view taken along the section line B3-B4 in FIG. 14A. FIGS. 14B and 14C each illustrate a cross section of the display element portion 104 in FIG. 1B; the touch sensor portion 102 and the cover glass portion 103 are omitted.

The plan view of the pixel 305 in FIG. 14A shows, for example, a conductive layer 321, a semiconductor layer 325, a conductive layer 326, a conductive layer 327, a conductive layer 322, a conductive layer 331, an opening 332, a semiconductor layer 333, a conductive layer 334, a conductive layer 335, an opening 324, an opening 336, the light-emitting layer 117, and the color filter 114.

The cross-sectional view, along the section line B1-B2, of the pixel 305 in FIG. 14B shows, for example, the substrate 111, the conductive layer 321, the conductive layer 322, an insulating layer 323, the opening 324, the semiconductor layer 325, the conductive layer 326, the conductive layer 327, an insulating layer 328, an insulating layer 329, the partition layer 116, and the conductive layer 118. FIG. 14B also illustrates the transistor 311.

The cross-sectional view, along the section line B3-B4, of the pixel 305 in FIG. 14C shows, for example, the substrate 111, the conductive layer 322, the conductive layer 331, the insulating layer 323, the opening 332, the semiconductor layer 333, the conductive layer 334, the conductive layer 335, the insulating layer 328, the color filter 114, the insulating layer 329, the conductive layer 113, the opening 336, the partition layer 116, the light-emitting layer 117, and the conductive layer 118. FIG. 14C also illustrates the transistor 312 and the EL element EL.

The conductive layer 321 is a wiring serving as a gate line. The conductive layer 321 can serve as a gate electrode of the transistor 311. As the conductive layer 321, a single layer or two or more layers of a film including a conductive material containing one or more kinds of aluminum, titanium, chromium, cobalt, nickel, copper, yttrium, zirconium, molybdenum, ruthenium, silver, tantalum, and tungsten are preferably formed.

The conductive layer 326 is a wiring serving as a source line. The conductive layer 326 can serve as one of a source and a drain of the transistor 311. The conductive layer 326 can be formed in a manner similar to that of the conductive layer 321.

The conductive layer 331 is a wiring serving as a power supply line. The conductive layer 331 can be formed in a manner similar to that of the conductive layer 321.

Each of the semiconductor layers 325 and 333 is a layer with semiconductor characteristics. The layer with semiconductor characteristics can be a semiconductor layer mainly containing silicon (Si), a semiconductor layer mainly containing an organic material, or a semiconductor layer mainly containing a metal oxide. An example of the semiconductor layer mainly containing a metal oxide is an oxide semiconductor layer.

The conductive layer 327 serves as the other of the source and the drain of the transistor 311. The conductive layer 327 can be formed in a manner similar to that of the conductive layer 321.

The opening 324 is an opening for directly connecting the conductive layer 327 to the conductive layer 322. The opening 324 is formed by removing part of the insulating layer 323.

The conductive layer 322 serves as a wiring for connection between the other of the source and the drain of the transistor 311 and the gate of the transistor 312. The conductive layer 322 can serve as a gate electrode of the transistor 312. The conductive layer 322 can be formed in a manner similar to that of the conductive layer 321.

The conductive layer 334 serves as a wiring for connecting one of a source and a drain of the transistor 312 to the conductive layer 331. The conductive layer 334 can serve as one of a source and a drain of the transistor 312. The conductive layer 334 can be formed in a manner similar to that of the conductive layer 321.

The opening 332 is an opening for directly connecting the conductive layer 331 to the conductive layer 334. The opening 332 is formed by removing part of the insulating layer 323.

The conductive layer 335 serves as a wiring for connecting the other of the source and the drain of the transistor 312 to the conductive layer 113. The conductive layer 335 can serve as the other of the source and the drain of the transistor 312. The conductive layer 335 can be formed in a manner similar to that of the conductive layer 321.

The insulating layer 323 serves as a gate insulating film of each of the transistors 311 and 312. The insulating layer 323, which has a single-layer structure or a stacked-layer structure, is formed using any of a silicon oxide film, a silicon oxynitride film, a silicon nitride oxide film, a silicon nitride film, an aluminum oxide film, and the like, for example.

The insulating layer 328 is formed using an insulating film of an inorganic material. In particular, the insulating layer 328 is preferably formed using a stack including an oxide film and a nitride film. The use of the nitride film for the insulating layer 328 can inhibit entry of impurities such as hydrogen and water into the semiconductor layer 325 and the semiconductor layer 333 from the outside. The insulating layer 328 can be a single layer or a stacked layer formed using an insulating film containing one or more of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide.

The insulating layer 329 is formed using an insulating film of an organic material. In particular, the insulating layer 329 preferably enables a layer or film to be formed thereover to be planarized. Heat-resistant organic materials such as an acrylic-based resin or a polyimide-based resin can be used for the insulating layer 329.

The opening 336 is an opening for directly connecting the conductive layer 113 to the conductive layer 335. The opening 336 is formed by removing part of the insulating layer 328 and part of the insulating layer 329.

In the above structure of this embodiment described using FIG. 13 and FIGS. 14A to 14C, the touch sensor is provided in the touch sensor portion on the second substrate side, and the color filter is provided in the display element portion on the first substrate side. Such a structure enables the touch sensor portion of the display device to be driven concurrently with the display element portion; thus, even in the case where frame frequencies are varied in the display element portion, a touch sensing period in the touch sensor portion can be secured.

Moreover, in the above structure of this embodiment described using FIG. 13 and FIGS. 14A to 14C, the touch sensor, which is formed by using a photomask, is provided on one surface of the second substrate, whereas a structure that is formed by using a photomask, such as an electrode, is not provided on the other surface of the second substrate. Therefore, in a touch sensor portion including the second substrate, there is no possibility that forming the touch sensor on one surface damages a structure on the other surface by contact or the like. As a result, defects caused on the rear surface side of the second substrate when a structure is formed on the front surface of the second substrate can be reduced, leading to an improvement in the reliability of the display device.

This embodiment can be combined with any of the other embodiments in this specification as appropriate.

Embodiment 4

In this embodiment, other components of the display device are described. In this embodiment, other components of the transverse electric field mode liquid crystal display device are specifically described.

<Structure of Connection Portion in Display Element Portion>

Figure 15A:
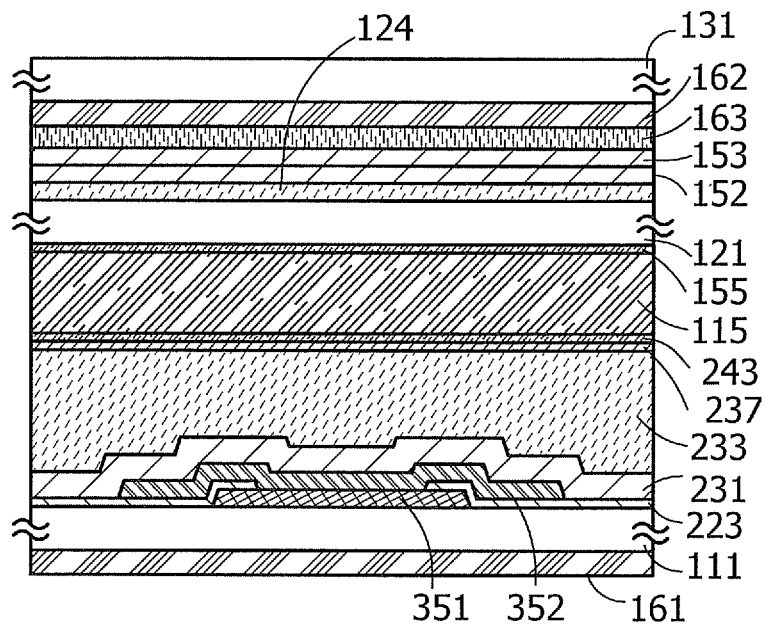
FIGS. 15A and 15B are cross-sectional views of connection portions.
Figure 15B:
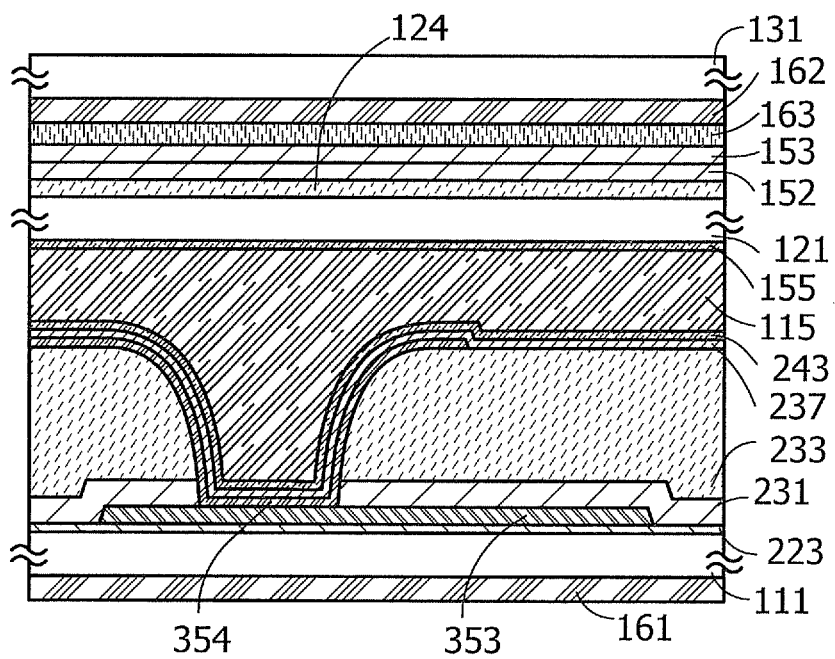

A structure of a connection portion where conductive layers formed in different layers are connected to each other is described below. FIG. 15A is a cross-sectional view illustrating an example of a structure of a connection portion where a conductive layer 351 and a conductive layer 352 are connected. In addition, FIG. 15B is a cross-sectional view illustrating an example of a structure of a connection portion where a conductive layer 353 and a conductive layer 354 are connected.

The cross-sectional view of the connection portion in FIG. 15A shows, for example, the polarizing plate 161, the substrate 111, the conductive layer 351, the insulating layer 223, the conductive layer 352, the insulating layer 231, the insulating layer 233, the insulating layer 237, the alignment film 243, the liquid crystal layer 115, the alignment film 155, the substrate 121, the conductive layer 124, the insulating layer 152, the insulating layer 153, the bonding layer 163, the polarizing plate 162, and the substrate 131.

The conductive layer 351 is formed in the same layer as the conductive layer 221. The conductive layer 351 can be formed in a manner similar to that of the conductive layer 221.

The conductive layer 352 is formed in the same layer as the conductive layers 227 and 229. The conductive layer 352 can be formed in a manner similar to that of the conductive layer 221.

At the connection portion of the conductive layer 351 and the conductive layer 352, the insulating layer 223 provided between the conductive layer 351 and the conductive layer 352 is removed. Thereby, the conductive layer 351 and the conductive layer 352 can be directly connected to each other.

The cross-sectional view of the connection portion in FIG. 15B shows, for example, the polarizing plate 161, the substrate 111, the insulating layer 223, the conductive layer 353, the conductive layer 354, the insulating layer 231, the insulating layer 233, the insulating layer 237, the alignment film 243, the liquid crystal layer 115, the alignment film 155, the substrate 121, the conductive layer 124, the insulating layer 152, the insulating layer 153, the bonding layer 163, the polarizing plate 162, and the substrate 131.

The conductive layer 353 is formed in the same layer as the conductive layers 227 and 229. The conductive layer 353 can be formed in a manner similar to that of the conductive layer 221.

The conductive layer 354 is formed in the same layer as the conductive layer 113. The conductive layer 354 can be formed in a manner similar to that of the conductive layer 113.

At the connection portion of the conductive layer 353 and the conductive layer 354, the insulating layer 231 and the insulating layer 233 provided between the conductive layer 353 and the conductive layer 354 are removed. Thereby, the conductive layer 353 and the conductive layer 354 can be directly connected to each other.

In the above structures of the connection portions described using FIGS. 15A and 15B, the touch sensor, which is formed by using a photomask, is provided on one surface of the second substrate, whereas a structure that is formed by using a photomask, such as an electrode, is not provided on the other surface of the second substrate. Therefore, in a touch sensor portion including the second substrate, there is no possibility that forming the touch sensor on one surface damages a structure on the other surface by contact or the like. As a result, defects caused on the rear surface side of the second substrate when a structure is formed on the front surface of the second substrate can be reduced, leading to an improvement in the reliability of the display device.

<Structure of Terminal Portion in Display Element Portion and Touch Sensor Portion>

Figure 16:
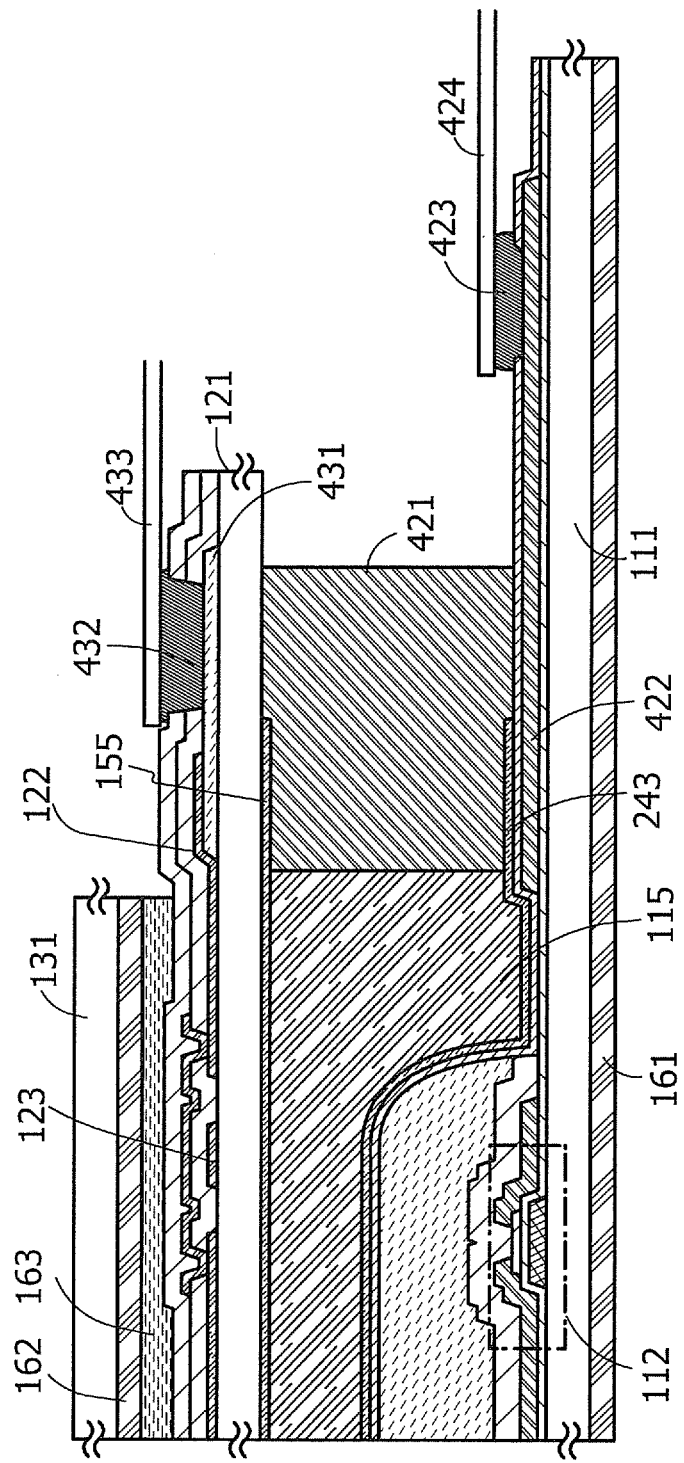
FIG. 16 is a cross-sectional view of a terminal portion.

Next, a structural example of a terminal portion will be described. FIG. 16 is a cross-sectional view illustrating the structural example of the terminal portion.

The cross-sectional view of the terminal portion in FIG. 16 shows, for example, the polarizing plate 161, the substrate 111, the transistor 112, the liquid crystal layer 115, the alignment film 243, a sealant 421, a conductive layer 422, a conductive layer 423, a flexible printed circuit (FPC) 424, the alignment film 155, the substrate 121, the electrodes 122 and 123, a conductive layer 431, a conductive layer 432, an FPC 433, the bonding layer 163, the polarizing plate 162, and the substrate 131.

The sealant 421 is provided to seal in a liquid crystal layer inside. In addition, the sealant 421 is provided to block moisture from the outside and maintain a constant interval between substrates, between which the liquid crystal layer is provided. Note that when an end portion of the alignment film 243 and an end portion of the alignment film 155 are on the inner side than the sealant 421, it is difficult to control the alignment in an end portion of the liquid crystal layer. Further, when the end portion of the alignment film 243 and the end portion of the alignment film 155 are on the outer side than the sealant 421, the adhesion at the upper and lower contacts of the sealant 421 is lowered, which makes it difficult to seal in the liquid crystal layer. Therefore, in the cross section, the end portion of the alignment film 243 and the end portion of the alignment film 155 are preferably positioned near the middle of the width of the sealant 421, as shown in FIG. 16.

The conductive layer 422 is formed in the same layer as the conductive layers 227 and 229. The conductive layer 422 serves as a wiring led out from the inner side than the sealant 421 to the outer side. The conductive layer 422 can be formed in a manner similar to that of the conductive layer 221.

The conductive layer 423 is a conductive layer for electrically connecting the conductive layer 422 to the FPC 424. The conductive layer 423 can be an anisotropic conductive film, for example. The anisotropic conductive film is formed by curing a paste-form or sheet-form material that is obtained by mixing conductive particles to a thermosetting resin or a thermosetting and photo-curing resin. The anisotropic conductive film exhibits anisotropic conductivity by light irradiation or thermocompression bonding. As conductive particles used for the anisotropic conductive film, for example, particles of a spherical organic resin coated with thin-film metal such as Au, Ni, or Co can be used.

The FPC 424 is a circuit board in which a bonding layer is formed over a film-like insulator and a conductor pattern made of copper or the like is formed over the bonding layer. The conductor pattern of the FPC 424 is covered with and protected by an insulating film of polyimide or a solder resist except in, for example, a portion in contact with the conductive layer 423.

The conductive layer 431 is formed in the same layer as the conductive layer 124. The conductive layer 431 can be formed in a manner similar to that of the conductive layer 221.

The conductive layer 432 is a conductive layer for electrically connecting the conductive layer 431 to the FPC 433. Similarly to the conductive layer 423, the conductive layer 432 can be an anisotropic conductive film.

Similarly to the FPC 424, the FPC 433 is a circuit board in which a bonding layer is formed over a film-like insulator and a conductor pattern made of copper or the like is formed over the bonding layer.

In the above structure of the display device described using FIG. 16, the touch sensor is provided in the touch sensor portion on the second substrate side, and the color filter is provided in the display element portion on the first substrate side. Such a structure enables the touch sensor portion of the display device to be driven concurrently with the display element portion; thus, even in the case where frame frequencies are varied in the display element portion, a touch sensing period in the touch sensor portion can be secured.

Moreover, in the above structure of the display device described using FIG. 16, the touch sensor, which is formed by using a photomask, is provided on one surface of the second substrate, whereas a structure that is formed by using a photomask, such as an electrode, is not provided on the other surface of the second substrate. Therefore, in a touch sensor portion including the second substrate, there is no possibility that forming the touch sensor on one surface damages a structure on the other surface by contact or the like. As a result, defects caused on the rear surface side of the second substrate when a structure is formed on the front surface of the second substrate can be reduced, leading to an improvement in the reliability of the display device.

<Structure of Transistor in Display Element Portion>

Transistors in the display device, including the transistor 112, and a method for fabricating these transistors are described below. Note that a transistor that includes an oxide semiconductor layer as a semiconductor layer is described here.

A method for fabricating the transistor 112 is described with reference to FIGS. 17A to 17D and FIGS. 18A to 18C. FIGS. 17A to 17D and FIGS. 18A to 18C are cross-sectional views illustrating an example of the method for fabricating the transistor 112 in the display element portion 101, and transistors included in the driver circuits can also be formed over the same substrate at the same time as the transistor 112 to have structures similar to that of the transistor 112.

Components in FIGS. 17A to 17D and FIGS. 18A to 18C are described first. With reference to FIGS. 17A to 17D and FIGS. 18A to 18C, a substrate 400, a conductive film 401, a gate electrode 402, an insulating film 403, an oxide semiconductor film 405, an island-shaped oxide semiconductor layer 406, a conductive film 407, a source electrode 408, a drain electrode 409, an insulating layer 410, an insulating layer 411, and an insulating layer 412 are described in order. Note that the substrate 400 has the same structure as that of the substrate 111 described in the above embodiment; the gate electrode 402 has the same structure as that of the conductive layer 221 described in the above embodiment; the insulating film 403 has the same structure as that of the insulating layer 223 described in the above embodiment; the island-shaped oxide semiconductor layer 406 has the same structure as that of the semiconductor layer 225 described in the above embodiment; the source electrode 408 has the same structure as that of the conductive layer 227 described in the above embodiment; the drain electrode 409 has the same structure as that of the conductive layer 229 described in the above embodiment; and an insulating layer 413 in which the insulating layers 410, 411, and 412 are stacked has the same structure as that of the insulating layer 231 described in the above embodiment.

Figure 17A:
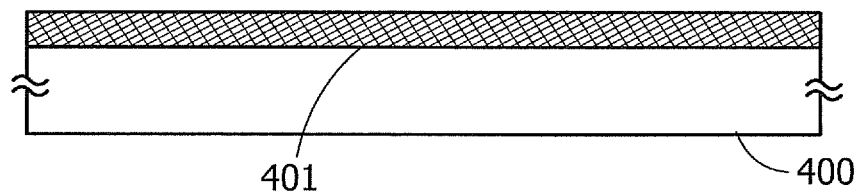
FIGS. 17A to 17D are cross-sectional views illustrating a method for manufacturing a transistor.

As illustrated in FIG. 17A, the conductive film 401 serving as a wiring and an electrode in the first layer is formed over the substrate 400.

For example, as the conductive film 401, a film in which a copper film is stacked over a tungsten nitride film or a single-layer tungsten film can be formed.

Figure 17B:
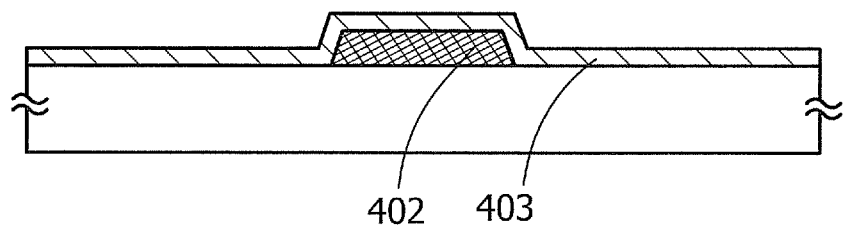

Next, as illustrated in FIG. 17B, the conductive film 401 is processed into the gate electrode 402 of the transistor.

The insulating film 403 is formed to cover the gate electrode 402.

The insulating film 403 serves as a gate insulating film of the transistor.

The insulating film 403 may be a multilayer film in which a first layer as a lower layer is a silicon nitride film and a second layer as an upper layer is a silicon oxide film. The silicon oxide film in the second layer can be a silicon oxynitride film. The silicon nitride film in the first layer can be a silicon nitride oxide film.

As the silicon oxide film, a silicon oxide film with a low defect density is preferably used. Specifically, a silicon oxide film whose spin density attributed to a signal with a g factor of 2.001 in electron spin resonance (ESR) is less than or equal to $3 \times 10^{17}$ spins/cm$^3$, preferably less than or equal to $5 \times 10^{16}$ spins/cm$^3$ is used. As the silicon oxide film, a silicon oxide film containing excess oxygen is preferably used. As the silicon nitride film, a silicon nitride film from which hydrogen and ammonia are less released is used. The amount of released hydrogen and ammonia can be measured by thermal desorption spectroscopy (TDS) analysis.

Figure 17C:
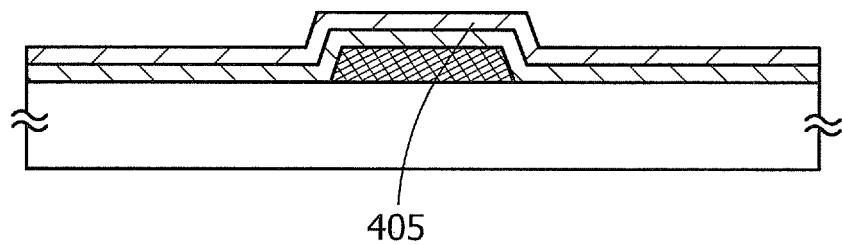

Next, as illustrated in FIG. 17C, the oxide semiconductor film 405 is formed over the insulating film 403. Here, the oxide semiconductor film 405 is formed using an In—Ga—Zn-based oxide film by a sputtering method.

As the oxide semiconductor used for the semiconductor layer of the transistor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

For example, an In—Ga—Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

When the oxide semiconductor film forming the semiconductor layer contains a large amount of hydrogen, the hydrogen and the oxide semiconductor are bonded to each other, so that part of the hydrogen serves as a donor and causes generation of an electron which is a carrier. As a result, the threshold voltage of the transistor shifts in the negative direction. Therefore, it is preferable that, after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. For that reason, it is preferable that oxygen be added to the oxide semiconductor film to fill oxygen vacancies in the oxide semiconductor film, which are produced by the dehydration treatment (dehydrogenation treatment). In this specification and the like, supplying oxygen to an oxide semiconductor film is expressed as oxygen adding treatment, and treatment for making the oxygen content of an oxide semiconductor film be in excess of that in the stoichiometric composition is expressed as treatment for making an oxygen-excess state in some cases.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) or substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density of lower than or equal to $1\times10^{17}/cm^3$, lower than or equal to $1\times10^{16}/cm^3$, lower than or equal to $1\times10^{15}/cm^3$, lower than or equal to $1\times10^{14}/cm^3$, or lower than or equal to $1\times10^{13}/cm^3$.

Thus, the transistor including an i-type or substantially i-type oxide semiconductor film can have extremely favorable off-state current characteristics. For example, the drain current at the time when the transistor including an oxide semiconductor film is in an off state can be less than or equal to $1\times10^{-18}$ A, preferably less than or equal to $1\times10^{-21}$ A, further preferably less than or equal to $1\times10^{-24}$ A at room temperature (approximately 25° C.); or less than or equal to $1\times10^{-15}$ A, preferably less than or equal to $1\times10^{-18}$ A, further preferably less than or equal to $1\times10^{-21}$ A at 85° C. Note that an off state of an n-channel transistor refers to a state where the gate voltage is sufficiently lower than the threshold voltage. Specifically, the transistor is in an off state when the gate voltage is lower than the threshold voltage by 1 V or more, 2 V or more, or 3 V or more.

An oxide semiconductor may include a non-single-crystal, for example. The non-single-crystal is, for example, structured by at least one of c-axis aligned crystal (CAAC), polycrystal, microcrystal, and an amorphous part.

An oxide semiconductor may include CAAC, for example. Note that an oxide semiconductor including CAAC is referred to as a CAAC-OS (c-axis aligned crystalline oxide semiconductor).

In an image obtained with a transmission electron microscope (TEM), for example, crystal parts can be found in the CAAC-OS in some cases. In most cases, in an image obtained with a TEM, crystal parts in the CAAC-OS each fit inside a cube whose one side is less than 100 nm, for example. In an image obtained with a TEM, a boundary between the crystal parts in the CAAC-OS is not clearly observed in some cases. Further, in an image obtained with a TEM, a grain boundary in the CAAC-OS is not clearly observed in some cases. In the CAAC-OS, since a clear grain boundary does not exist, for example, segregation of an impurity is unlikely to occur. In the CAAC-OS, since a clear grain boundary does not exist, for example, high density of defect states is unlikely to occur. In the CAAC-OS, since a clear grain boundary does not exist, for example, a reduction in electron mobility is unlikely to occur.

For example, the CAAC-OS includes a plurality of crystal parts. In the plurality of crystal parts, c-axes are aligned in a direction parallel to a normal vector of a surface where the CAAC-OS is formed or a normal vector of a surface of the CAAC-OS in some cases. When the CAAC-OS is analyzed by an out-of-plane method with an X-ray diffraction (XRD) apparatus, a peak at 2θ of around 31 degrees which shows alignment appears in some cases. Further, for example, spots (luminescent spots) are observed in an electron diffraction pattern of the CAAC-OS in some cases. An electron diffraction pattern obtained with an electron beam having a diameter of 10 nmϕ or smaller, or 5 nmϕ or smaller, is called a nanobeam electron diffraction pattern. In the CAAC-OS, for example, among crystal parts, the directions of the a-axis and the b-axis of one crystal part are different from those of another crystal part, in some cases. In the CAAC-OS, for example, c-axes are aligned, and a-axes and/or b-axes are not macroscopically aligned, in some cases.

In each of the crystal parts included in the CAAC-OS, for example, a c-axis is aligned in a direction parallel to a normal vector of a surface where the CAAC-OS is formed or a normal vector of a surface of the CAAC-OS. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that among crystal parts, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

Further, the CAAC-OS can be formed, for example, by reducing the density of defect states. In an oxide semiconductor, for example, oxygen vacancies are defect states. The oxygen vacancies serve as trap states or serve as carrier generation sources when hydrogen is trapped therein. In order to form the CAAC-OS, for example, it is important to prevent oxygen vacancies from being generated in the oxide semiconductor. Thus, the CAAC-OS is an oxide semiconductor having a low density of defect states. In other words, the CAAC-OS is an oxide semiconductor having few oxygen vacancies.

The state in which impurity concentration is low and density of defect states is low (the number of oxygen vacancies is small) is referred to as "highly purified intrinsic" or "substantially highly purified intrinsic". A highly purified intrinsic or substantially highly purified intrinsic oxide semiconductor has few carrier generation sources, and thus has a low carrier density in some cases. Thus, in some cases, a transistor including the oxide semiconductor in a channel formation region rarely has a negative threshold voltage (is rarely normally-on). A highly purified intrinsic or substantially highly purified intrinsic oxide semiconductor has a low density of defect states and accordingly has a low density of trap states in some cases. Thus, the transistor including the oxide semiconductor in the channel formation region has a small variation in electrical characteristics and high reliability in some cases. Charges trapped by the trap states in the oxide semiconductor take a long time to be released and may behave like fixed charges. Thus, the transistor which includes the oxide semiconductor having a high density of trap states in the channel formation region has unstable electrical characteristics in some cases.

A transistor including the highly purified intrinsic or substantially highly purified intrinsic CAAC-OS has a small variation in the electrical characteristics due to irradiation with visible light or ultraviolet light.

An oxide semiconductor may include polycrystal, for example. Note that an oxide semiconductor including polycrystal is referred to as a polycrystalline oxide semiconductor. A polycrystalline oxide semiconductor includes a plurality of crystal grains.

An oxide semiconductor may include microcrystal, for example. Note that an oxide semiconductor including microcrystal is referred to as a microcrystalline oxide semiconductor.

In an image obtained with a TEM, for example, crystal parts cannot be found clearly in the microcrystalline oxide semiconductor in some cases. In most cases, the size of a crystal part included in the microcrystalline oxide semiconductor is greater than or equal to 1 nm and less than or equal to 100 nm, or greater than or equal to 1 nm and less than or equal to 10 nm, for example. A microcrystal with a size greater than or equal to 1 nm and less than or equal to 10 nm is specifically referred to as nanocrystal (nc), for example. An oxide semiconductor including nanocrystal is referred to as a nanocrystalline oxide semiconductor (nc-OS). In an image of the nc-OS obtained with a TEM, for example, a boundary between crystal parts is not clearly observed in some cases. In an image of the nc-OS obtained with a TEM, for example, since a clear grain boundary does not exist, segregation of an impurity is unlikely to occur. In the nc-OS, since a clear grain boundary does not exist, for example, high density of defect states is unlikely to occur. In the nc-OS, since a clear grain boundary does not exist, for example, a reduction in electron mobility is unlikely to occur.

In the nc-OS, for example, a microscopic region (for example, a region with a size greater than or equal to 1 nm and less than or equal to 10 nm) has a periodic atomic order occasionally. Further, for example, in the nc-OS, crystal parts are not regularly-arranged. Thus, there is a case where periodic atomic order is not observed macroscopically or a case where long-range order in atomic arrangement is not observed. Accordingly, in some cases, the nc-OS cannot be distinguished from an amorphous oxide semiconductor, for example, depending on an analysis method. When the nc-OS is analyzed by an out-of-plane method with an XRD apparatus using an X-ray having a beam diameter larger than a diameter of a crystal part, a peak which shows alignment does not appear in some cases. Further, for example, a halo pattern is observed in some cases in an electron diffraction pattern of the nc-OS obtained by using an electron beam having a diameter larger than that of a crystal part (e.g., a beam diameter of 20 nmϕ or more, or 50 nmϕ or more). For example, spots are observed in some cases in a nanobeam electron diffraction pattern of the nc-OS obtained by using an electron beam having a diameter smaller than or equal to that of a crystal part (e.g., a beam diameter of 10 nmϕ or less, or 5 nmϕ or less). In a nanobeam electron diffraction pattern of the nc-OS, for example, regions with high luminance in a circular pattern are observed in some cases. In a nanobeam electron diffraction pattern of the nc-OS, for example, a plurality of spots are observed in the region in some cases.

Since the microscopic region in the nc-OS has a periodic atomic order occasionally, the nc-OS has lower density of defect states than the amorphous oxide semiconductor. Note that since crystal parts in the nc-OS are not regularly-arranged, the nc-OS has higher density of defect states than the CAAC-OS.

Note that the oxide semiconductor may be a mixed film including two or more of a CAAC-OS, a polycrystalline oxide semiconductor, a microcrystalline oxide semiconductor, and an amorphous oxide semiconductor. The mixed film includes two or more of an amorphous oxide semiconductor region, a microcrystalline oxide semiconductor region, a polycrystalline oxide semiconductor region, and a CAAC-OS region in some cases. The mixed film has a stacked-layer structure of two or more of an amorphous oxide semiconductor region, a microcrystalline oxide semiconductor region, a polycrystalline oxide semiconductor region, and a CAAC-OS region in some cases.

Figure 17D:
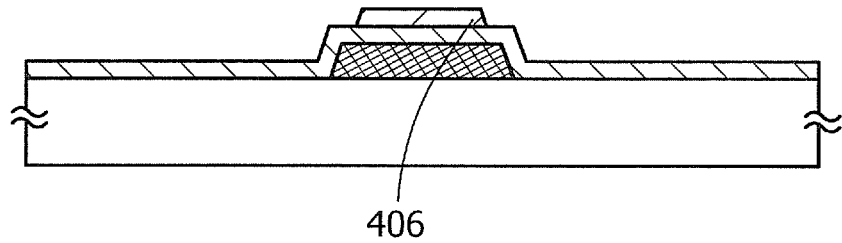

Next, as illustrated in FIG. 17D, the oxide semiconductor film 405 is processed into the island-shaped oxide semiconductor layer 406.

Figure 18A:
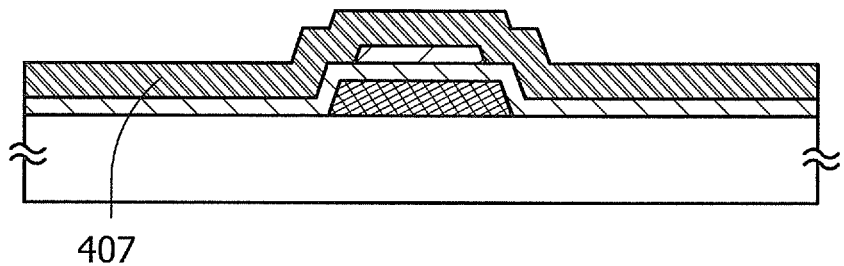
FIGS. 18A to 18C are cross-sectional views illustrating a method for manufacturing a transistor.

Then, as illustrated in FIG. 18A, the conductive film 407 serving as source and drain electrodes of the transistor or serving as a source line is formed. The conductive film 407 can be formed in a manner similar to that of the conductive film 401. As an example, a three-layer structure is employed for the conductive film 407. Titanium films are formed as the first and third layers and an aluminum film is formed as the second layer. The titanium films and the aluminum film are formed by a sputtering method.

Figure 18B:
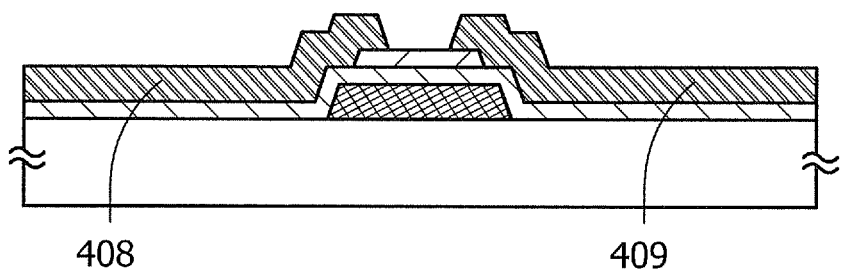

Next, as illustrated in FIG. 18B, the conductive film 407 is processed into the source electrode 408 and the drain electrode 409.

Figure 18C:
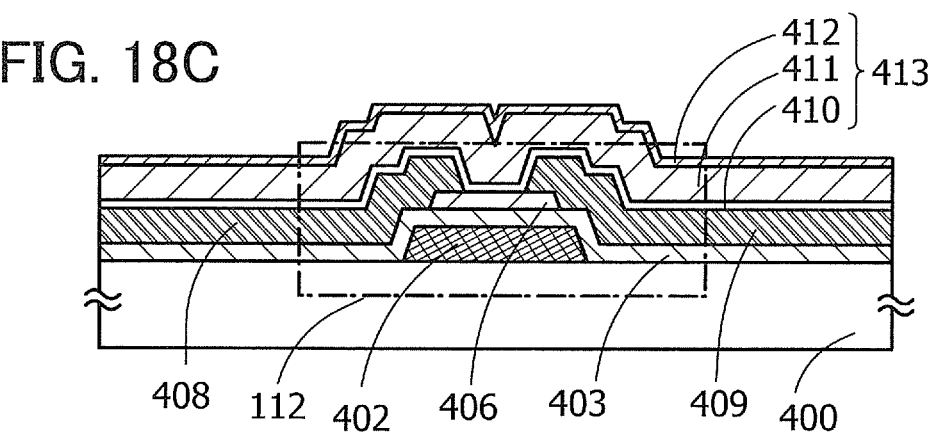

Next, as illustrated in FIG. 18C, the insulating layer 413 in which the insulating layers 410 to 412 are stacked is formed.

Further, in the case where one or both of the insulating layers 410 and 411 is/are oxide film(s), the oxygen content of the oxide film is preferably higher than that in the stoichiometric composition. In that case, oxygen can be prevented from being released from the island-shaped oxide semiconductor layer 406, and the oxygen contained in an oxygen-excess region can be transferred to the oxide semiconductor layer 406 to fill oxygen vacancies.

When the insulating layer 411 is an oxide film in which the oxygen content is higher than that in the stoichiometric composition, the insulating layer 410 is preferably an oxide film through which oxygen can pass. Oxygen which enters the insulating layer 410 from the outside partly remains in the insulating layer 410. Further, oxygen that has been originally contained in the insulating layer 410 is released from the insulating layer 410 to the outside in some cases. Thus, the insulating layer 410 is preferably an oxide insulating film having a high coefficient of diffusion of oxygen.

When a nitride insulating film is used as the insulating layer 412, an insulating film having a barrier property against nitrogen is preferably used as one or both of the insulating layer 410 and the insulating layer 411. For example, a dense oxide insulating film can have a barrier property against nitrogen. Specifically, an oxide insulating film whose etching rate is less than or equal to 10 nm per minute with use of 0.5 wt % fluoric acid at 25° C. is preferred.

The insulating layers 410 to 412 can be formed by any of a variety of deposition methods such as a PECVD method and a sputtering method. It is preferable that the insulating layers 410 to 412 be formed in succession in a vacuum. In such a case, entry of impurities into the interfaces between the insulating layer 410, the insulating layer 411, and the insulating layer 412 can be inhibited. In the case where the insulating layer 410 and the insulating layer 411 are formed using the same kind of material, the interface between the insulating layer 410 and the insulating layer 411 cannot be clearly defined in some cases.

For example, as each of the insulating layers 410 and 411, a silicon oxide film or a silicon oxynitride film can be formed by a PECVD method under the following formation conditions. The substrate is held at a temperature higher than or equal to 180° C. and lower than or equal to 400° C., preferably higher than or equal to 200° C. and lower than or equal to 370° C., a deposition gas containing silicon and an oxidizing gas are introduced as a source gas into a treatment chamber, the pressure in the treatment chamber is greater than or equal to 20 Pa and less than or equal to 250 Pa, preferably greater than or equal to 40 Pa and less than or equal to 200 Pa, and high-frequency power is supplied to an electrode provided in the treatment chamber.

For example, in the case where a silicon nitride film with a low hydrogen content is formed by a PECVD apparatus as the insulating layer 412, the insulating layer 412 can be formed under the following conditions. The substrate is held at a temperature higher than or equal to 80° C. and lower than or equal to 400° C., preferably higher than or equal to 200° C. and lower than or equal to 370° C., a source gas is introduced into the treatment chamber, the pressure is greater than or equal to 100 Pa and less than or equal to 250 Pa, preferably greater than or equal to 100 Pa and less than or equal to 200 Pa, and high-frequency power is supplied to an electrode provided in the treatment chamber.

Preferably, heat treatment is performed after the insulating layer 411 is formed, so that excess oxygen contained in the insulating layer 410 or the insulating layer 411 is transferred to the island-shaped oxide semiconductor layer 406 to fill oxygen vacancies in the island-shaped oxide semiconductor layer 406. The heat treatment can be performed as heat treatment for dehydration or dehydrogenation of the island-shaped oxide semiconductor layer 406.

That is description of the method for fabricating transistors in the display device, including the transistor 112.

In the description with reference to FIGS. 17A to 17D and FIGS. 18A to 18C, the island-shaped oxide semiconductor layer 406 has a single-layer structure, but it can be an oxide semiconductor layer having a multilayer structure with two or more layers.

Figure 19A:
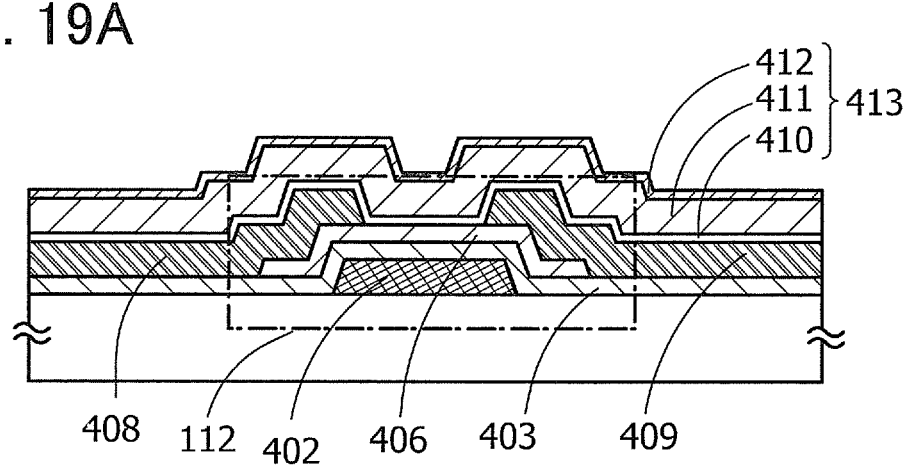
FIGS. 19A to 19C are cross-sectional views of transistors.

In the description with reference to FIGS. 17A to 17D and FIGS. 18A to 18C, the width of the gate electrode 402 is set larger than that of the oxide semiconductor layer 406 so that the gate electrode 402 blocks incidence of light on the oxide semiconductor layer 406; however, as shown in FIG. 19A, the width of the gate electrode 402 may be smaller than that of the oxide semiconductor layer 406.

Figure 19B:
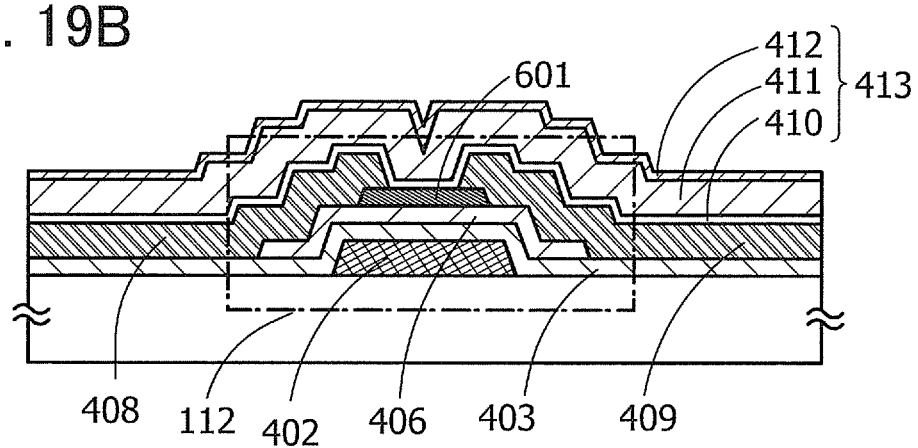
Figure 19C:
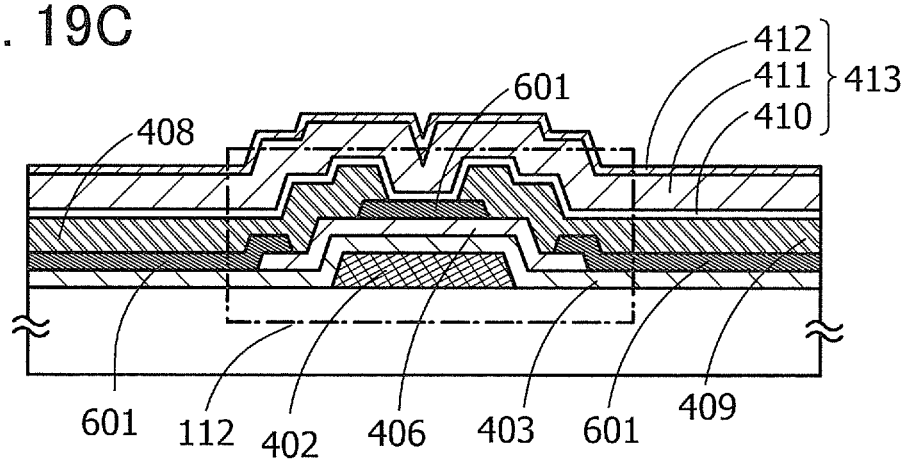

Further, in the description with reference to FIGS. 17A to 17D and FIGS. 18A to 18C, a channel-etched structure is employed; however, as shown in FIG. 19B, a channel protective structure in which an insulating layer 601 serving as a channel protective layer is provided may be employed. Further, as shown in FIG. 19C, the insulating layer 601 may be provided in a plurality of regions over the oxide semiconductor layer 406.

As described using FIGS. 17A to 17D, FIGS. 18A to 18C, and FIGS. 19A to 19C, an oxide semiconductor is used for the semiconductor layer of the transistor described in the above embodiment; thus, the transistor can have extremely low off-state current. Accordingly, the use of the transistor including an oxide semiconductor layer as the semiconductor layer as transistors in the display element portion can reduce flickers during display at a low frame frequency.

This embodiment can be implemented in combination with any of the other embodiments as appropriate.

Embodiment 5

In this embodiment, the operations of a display element portion and a touch sensor portion, including sensing of proximity or contact of an object by a touch sensor portion, are described. The touch sensor portion described in this embodiment has the structure of the mutual capacitive touch sensor portion described using FIGS. 5A and 5B, FIGS. 6A to 6E, and FIGS. 7A and 7B. The display element portion described in this embodiment has the structure of the display element portion using a transverse electric field mode liquid crystal element described using FIG. 2, FIGS. 3A and 3B, and FIGS. 4A and 4B.

<Example of Sensing Method of Sensor>

Figure 20A:
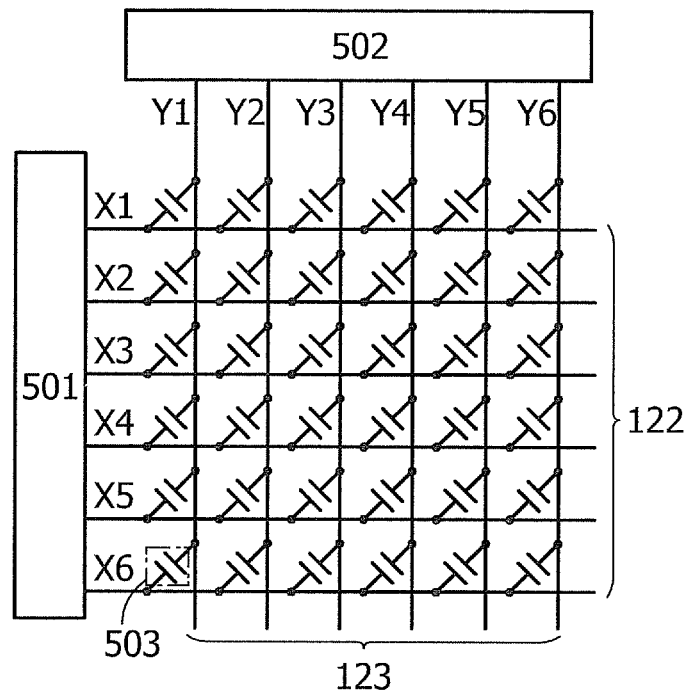
FIGS. 20A and 20B are a block diagram and a timing chart of a touch sensor portion.

FIG. 20A is a block diagram illustrating a structure of a mutual capacitive touch sensor portion. FIG. 20A illustrates a pulse voltage output circuit 501 and a current detection circuit 502. Note that in FIG. 20A, six wirings X1 to X6 represent the electrodes 122 to which pulse voltage is applied, and six wirings Y1 to Y6 represent the electrodes 123 that detect changes in current. FIG. 20A also illustrates a capacitance 503 that is formed where the electrodes 122 and 123 overlap with each other.

The pulse voltage output circuit 501 is a circuit for sequentially applying pulse voltage to the wirings X1 to X6. By application of pulse voltage to the wirings X1 to X6, an electric field is generated between the electrodes 122 and 123 forming the capacitance 503. When the electric field between the electrodes is shielded, for example, a change occurs in the capacitance 503 (mutual capacitance). Proximity or contact of an object can be sensed by utilizing this change.

The current detection circuit 502 is a circuit for detecting changes in current flowing through the wirings Y1 to Y6 that are caused by the change in the capacitance 503 (mutual capacitance). No change in current value is detected in the wirings Y1 to Y6 when there is no proximity or contact of an object, whereas a decrease in current value is detected when mutual capacitance is decreased owing to proximity or contact of an object. Note that an integrator circuit or the like is used for detection of current values.

Figure 20B:
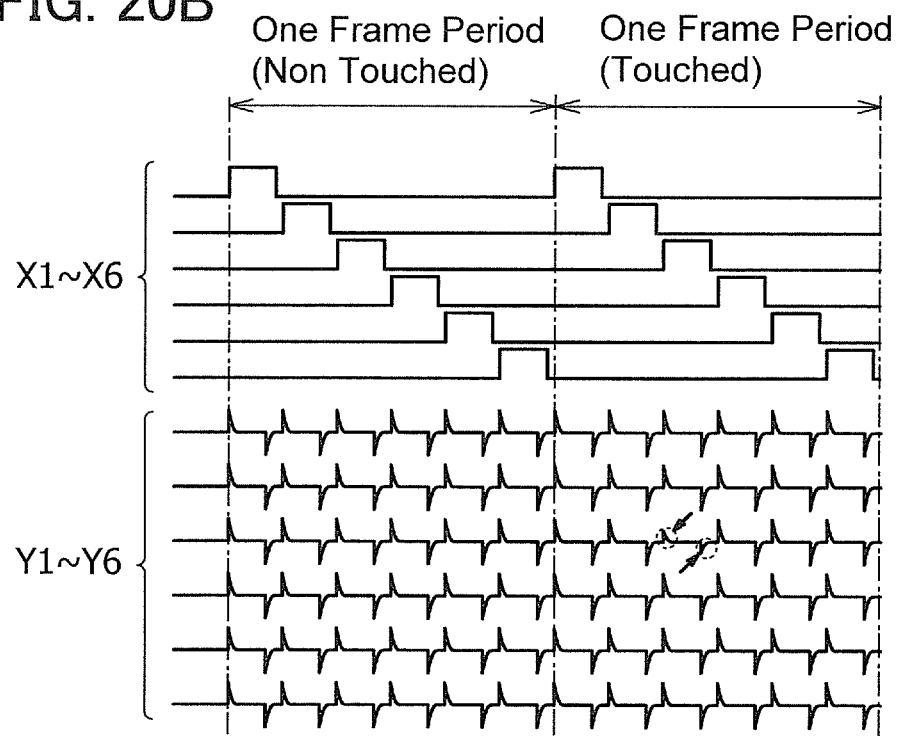

FIG. 20B is a timing chart of input and output waveforms in the mutual capacitive touch sensor portion shown in FIG. 20A. In FIG. 20B, detection of an object is performed in all the rows and columns in one frame period. FIG. 20B shows a period when an object is detected and a period when an object is not detected. For the wirings Y1 to Y6, detected current values are shown as waveforms of voltage values.

Pulse voltage is sequentially applied to the wirings X1 to X6, and waveforms of the wirings Y1 to Y6 change in accordance with the pulse voltage. When there is no proximity or contact of an object, the waveforms of the wirings Y1 to Y6 change in accordance with changes in the voltages of the wirings X1 to X6. When there is proximity or contact of an object, the current value is decreased at the point of proximity or contact of the object and accordingly the waveform of the voltage value changes.

By detecting a change in mutual capacitance in this manner, proximity or contact of an object can be sensed.

<Example of Driving of Display Element Portion>

Figure 21A:
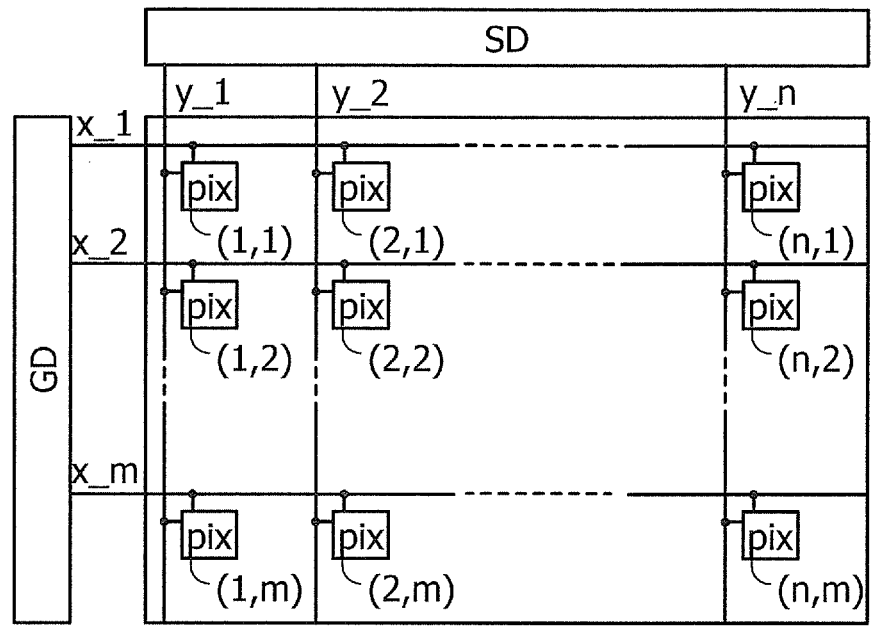
FIGS. 21A and 21B are a block diagram and a timing chart of a display element portion.

FIG. 21A is a block diagram illustrating an example of a structure of a display element portion. FIG. 21A illustrates a gate driver GD, a source driver SD, and pixels pix. In FIG. 21A, gate lines x_1 to x_m (m is a natural number) connected to the gate driver GD and source lines y_1 to y_n (n is a natural number) connected to the source driver SD are shown and the pixels pix are denoted by (1, 1) to (n, m).

Figure 21B:
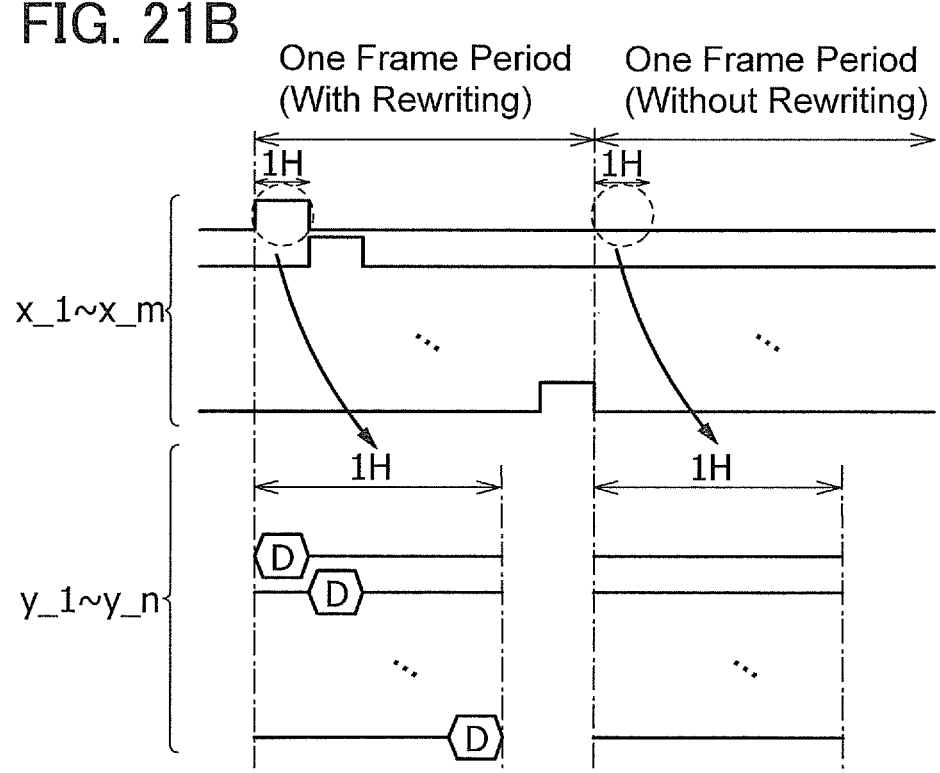

FIG. 21B is a timing chart of signals supplied to the gate lines and the source lines in the display element portion shown in FIG. 21A. The periods in FIG. 21B show the case where data signals are rewritten every frame period and the case where data signals are not rewritten. In FIG. 21B, periods such as a retrace period are not taken into consideration.

In the case where data signals are rewritten every frame period, scan signals are sequentially supplied to the gate lines x_1 to x_m. In a horizontal scanning period 1H, during which the scan signal is at an H level, data signals D are supplied to the source lines y_1 to y_n in the columns.

In the case where data signals are not rewritten every frame period, supply of scan signals to the gate lines x_1 to x_m is stopped. In the horizontal scanning period 1H, supply of data signals D to the source lines y_1 to y_n in the columns is stopped.

A driving method in which data signals are not rewritten every frame period is effective particularly when the semiconductor layer of a transistor included in a pixel is an oxide semiconductor layer. The transistor including an oxide semiconductor layer as the semiconductor layer can have extremely low off-state current. Thus, in the case where data signals are not rewritten every frame period, a data signal written in the previous period can be held.

<Driving of Display Element Portion and Touch Sensor Portion>

Figure 22A:
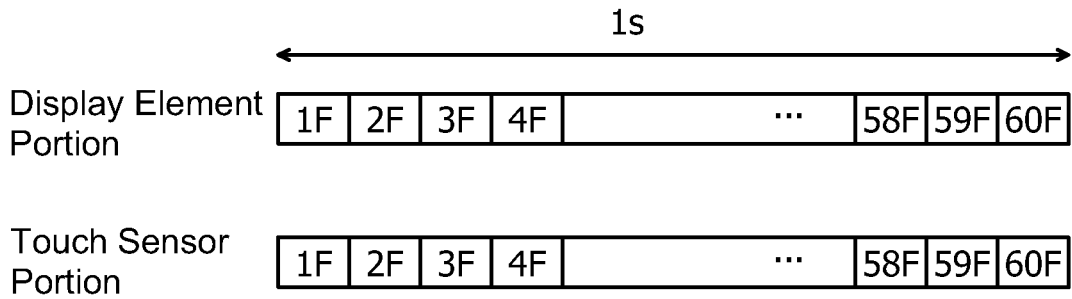
FIGS. 22A to 22D illustrate operations of a display device.

FIGS. 22A to 22D show examples of the operations in consecutive frame periods of the touch sensor portion described using FIGS. 20A and 20B and the display element portion described using FIGS. 21A and 21B that are driven for 1 s (one second). In FIG. 22A, one frame period for the display element portion is 16.7 ms (0.0167 seconds, frame frequency: 60 Hz), and one frame period for the touch sensor portion is 16.7 ms (frame frequency: 60 Hz).

Figure 22B:
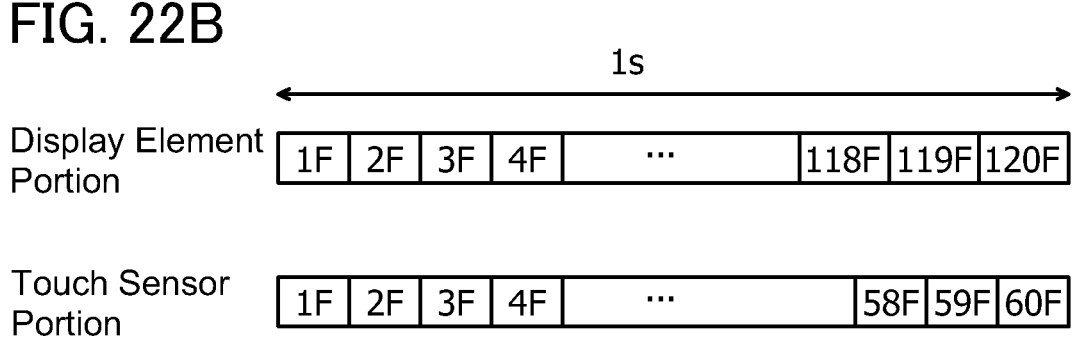

In the display device of this embodiment, the display element portion and the touch sensor portion operate independently of each other; thus, the touch sensor portion can have a touch sensing period concurrent with a display period. That is why one frame period for the display element portion and one frame period for the touch sensor portion can both be 16.7 ms (frame frequency: 60 Hz) as shown in FIG. 22A. Further, as shown in FIG. 22B, the operation can be switched so that one frame period for the display element portion is 8.3 ms (frame frequency: 120 Hz) and one frame period for the touch sensor portion is 16.7 ms (frame frequency: 60 Hz).

Moreover, in the display device of this embodiment, the following operation is possible: data signals are not rewritten in the display element portion and a data signal written in the previous period is held. In that case, one frame period can be longer than 16.7 ms. Thus, as shown in FIG. 22C, the operation can be switched so that one frame period for the display element portion is 1 s (frame frequency: 1 Hz) and one frame period for the touch sensor portion is 16.7 ms (frame frequency: 60 Hz).

Figure 22C:
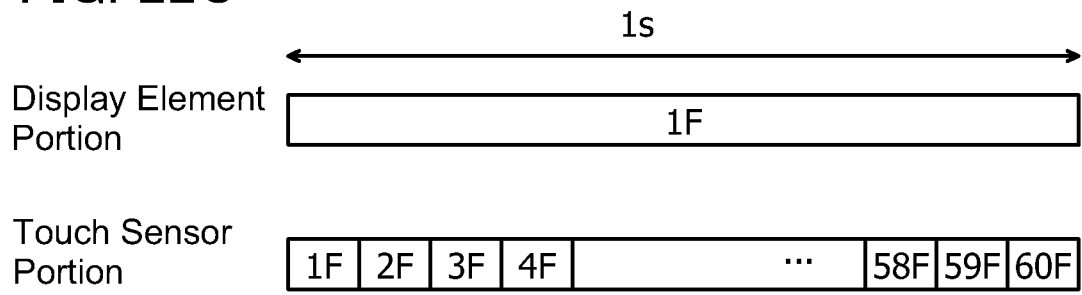
Figure 22D:
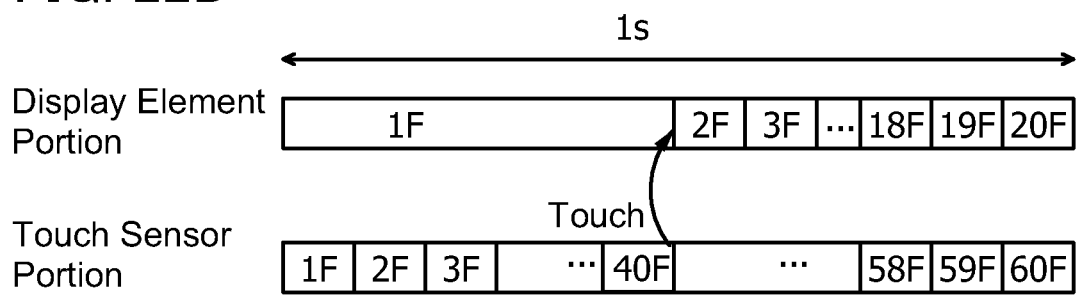

In the case where the display device of this embodiment is driven as shown in FIG. 22C, the touch sensor portion can be driven with an independent frame period from that of the display element portion. Thus, data signals in the display element portion can be rewritten at the timing at which proximity or contact of an object is sensed in the touch sensor portion, as shown in FIG. 22D.

As described above, in the display device of one embodiment of the present invention, the touch sensor is provided in the touch sensor portion on the second substrate side, and the color filter is provided in the display element portion on the first substrate side. Such a structure enables the touch sensor portion of the display device to be driven concurrently with the display element portion; thus, even in the case where frame frequencies are varied in the display element portion, a touch sensing period in the touch sensor portion can be secured.

This embodiment can be combined with any of the other embodiments in this specification as appropriate.

Embodiment 6

In this embodiment, an example of a structure in which the method for driving a display device described in the above embodiment can be used is described with reference to FIG. 23, FIG. 24, and FIG. 25. With a display device and a method for driving the display device described in this embodiment, power consumption can be reduced. In this embodiment, a structure of a liquid crystal display device including a liquid crystal element as a display element is specifically described; however, it is also possible to employ an EL display device including an EL element as a display element as described in the above embodiment.

<Block Diagram of Liquid Crystal Display Device>

Figure 23:
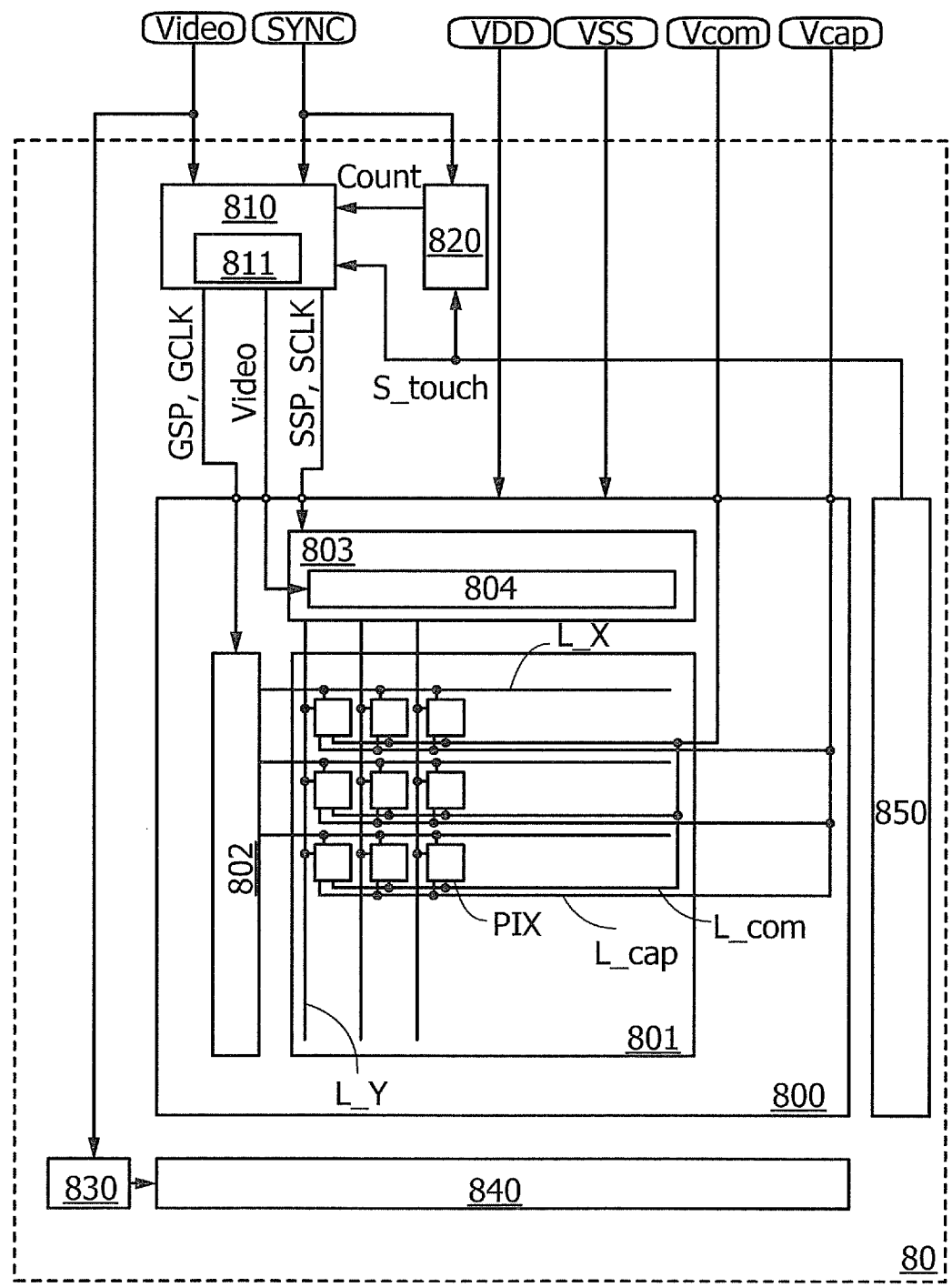
FIG. 23 is a block diagram of a liquid crystal display device.

FIG. 23 is a block diagram illustrating a structural example of a liquid crystal display device of this embodiment. As shown in FIG. 23, a liquid crystal display device 80 includes a liquid crystal panel 800, a control circuit 810, a counter circuit 820, a light source control circuit 830, a light source portion 840, and a touch sensor portion 850.

An image signal (Video), which is digital data, and a synchronization signal (SYNC) for controlling rewriting of a screen of the liquid crystal panel 800 are input to the liquid crystal display device 80. Examples of a synchronization signal include a horizontal synchronization signal (Hsync), a vertical synchronization signal (Vsync), and a reference clock signal (CLK).

The liquid crystal panel 800 includes a display portion 801, a gate driver 802, and a source driver 803. The display portion 801 includes a plurality of pixels PIX. The pixels PIX in the same row are connected to the gate driver 802 through a common gate line L_X, and the pixels PIX in the same column are connected to the source driver 803 through a common source line L_Y.

A high power supply voltage (VDD) and a low power supply voltage (VSS), which serve as power supply voltages, a common voltage (hereinafter referred to as Vcom), and a capacitor line voltage (hereinafter referred to as Vcap) are supplied to the liquid crystal panel 800. The common voltage (Vcom) is supplied to each pixel PIX in the display portion 801 through a common line L_com. The capacitor line voltage (Vcap) is supplied to each pixel PIX in the display portion 801 through a capacitor line L_cap.

The source driver 803 processes an input image signal to generate a data signal, and outputs the data signal to the source line L_Y. The gate driver 802 outputs, to the gate line L_X, a scan signal for selecting the pixel PIX into which a data signal is to be written.

The pixel PIX includes a switching element whose electrical connection to the source line L_Y is controlled by a scan signal. When the switching element is turned on, a data signal is written into the pixel PIX through the source line L_Y.

The control circuit 810 controls the whole liquid crystal display device 80 and includes a circuit which generates control signals for circuits included in the liquid crystal display device 80.

The control circuit 810 includes a control signal generation circuit which generates control signals for the gate driver 802 and the source driver 803 on the basis of the synchronization signal (SYNC). Examples of a control signal for the gate driver 802 include a start pulse (GSP) and a clock signal (GCLK). Examples of a control signal for the source driver 803 include a start pulse (SSP) and a clock signal (SCLK). For example, the control circuit 810 generates a plurality of clock signals with the same cycle and shifted phases as the clock signals (GCLK and SCLK).

Further, the control circuit 810 controls output of an image signal (Video), which is input from the outside of the liquid crystal display device 80, to the source driver 803.

In addition, a sensor signal (S_touch) is input to the control circuit 810 from the touch sensor portion 850, and the control circuit 810 corrects an image signal in accordance with the sensor signal. The correction of the image signal is based on the sensor signal; image processing corresponding to touch operation is performed.

The source driver 803 includes a digital/analog conversion circuit 804 (hereinafter referred to as a D-A conversion circuit 804). The D-A conversion circuit 804 converts an image signal to an analog signal, thereby generating a data signal.

Note that in the case where an image signal input to the liquid crystal display device 80 is an analog signal, the image signal is converted to a digital signal in the control circuit 810 and output to the liquid crystal panel 800.

An image signal is image data for each frame. The control circuit 810 has a function of performing image processing on the image data and controlling output of the image signal to the source driver 803 on the basis of data obtained by the processing. For that function, the control circuit 810 includes a motion detection portion 811 which performs image processing on the image data to detect motion in the image data for each frame. In the case where a sensor signal is input, the image signal is corrected in accordance with the sensor signal.

When the motion detection portion 811 determines that there is motion, the control circuit 810 continues to output image signals to the source driver 803. The control circuit 810 stops output of image signals to the source driver 803 when the motion detection portion 811 determines that there is no motion, and restarts the output of image signals when the motion detection portion 811 determines that there is motion.

The control circuit 810 controls display in the display portion 801 by switching between a first mode for displaying images with motion (moving image display) and a second mode for displaying images without motion (still image display) based on determination by the motion detection portion 811. In the first mode, when the frequency of the vertical synchronization signal (Vsync) is 60 Hz, for example, the frame frequency is set to 60 Hz or higher. In the second mode, when the frequency of the vertical synchronization signal (Vsync) is 60 Hz, for example, the frame frequency is set to lower than 60 Hz.

The frame frequency in the second mode is preferably set in advance in accordance with a voltage holding property of a pixel. For example, when the motion detection portion 811 determines that there is no motion for a certain period of time and the control circuit 810 stops the output of image signals to the source driver 803, a voltage corresponding to a gray level of an image signal that is written in the pixel PIX is lowered. Therefore, it is preferable to write in a voltage corresponding to a gray level of an image signal for the same image in accordance with the frame frequency (such operation is also called refresh operation). The timing of the refresh operation (also referred to as refresh rate) is set such that the refresh operation is performed every certain period of time. The timing is based on, for example, a signal obtained by counting the H level of the vertical synchronization signal (Vsync) in the counter circuit 820.

In the case where the refresh rate is set to once every second, when the frequency of the vertical synchronization signal (Vsync) is 60 Hz, for example, refresh operation is performed in response to a count signal (Count) that is output after the counter circuit 820 counts the H level of the vertical synchronization signal (Vsync) up to 60. In the case where the refresh rate is set to once every five seconds, when the frequency of the vertical synchronization signal (Vsync) is 60 Hz, for example, refresh operation is performed in response to a count signal (Count) that is output after the counter circuit 820 counts the H level of the vertical synchronization signal (Vsync) up to 300. Further, the following operation is possible: when a sensor signal is input from the touch sensor portion 850, the counter circuit 820 forcibly switches the control circuit 810 from the second mode to the first mode in accordance with the sensor signal.

Note that there is no particular limitation on the image processing for detecting motion which is performed in the motion detection portion 811. An example of a method for detecting motion is to obtain difference data from image data for two consecutive frames. It can be determined whether there is motion or not from the obtained difference data. Another example of the method is to detect a motion vector.

The light source control circuit 830 is a circuit for controlling the light source portion 840 in accordance with an image signal (Video). Note that the light source control circuit 830 is not necessarily provided inside the liquid crystal display device 80 and may be provided as appropriate.

A plurality of light sources are provided in the light source portion 840. The light source in the light source portion 840 can be a cold cathode fluorescent lamp, a light-emitting diode (LED), an OLED element generating luminescence (electroluminescence) when an electric field is applied thereto, or the like.

The operation and structure of the touch sensor portion described in the above embodiment can be applied to the touch sensor portion 850.

In the display device of this embodiment, the display panel 800 and the touch sensor portion 850 operate independently of each other; thus, the touch sensor portion 850 can have a touch sensing period concurrent with a display period. Accordingly, even in the structure in which the control circuit 810 switches between the first mode and the second mode, the operation of the touch sensor portion can be controlled independently of those modes.

<Structural Example of Pixel>

Figure 24:
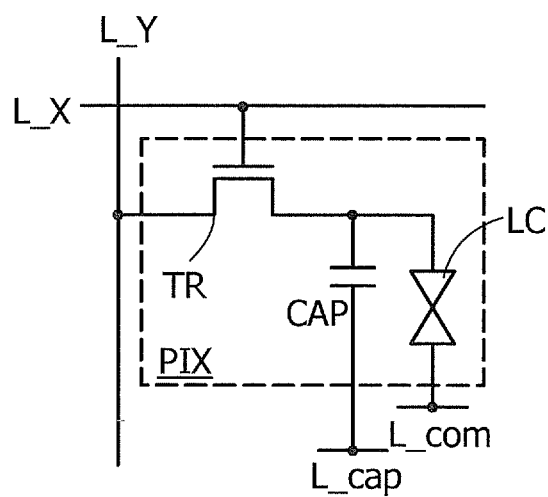
FIG. 24 is a circuit diagram of a pixel.

FIG. 24 is a circuit diagram illustrating a structural example of the pixel PIX. The pixel PIX includes a transistor TR, a liquid crystal element LC, and a capacitor CAP.

The transistor TR is a switching element which controls electrical connection between the liquid crystal element LC and the source line L_Y. The transistor TR is turned on or off by a scan signal input to its gate. Note that a transistor including an oxide semiconductor is suitably used as the transistor TR.

The liquid crystal element LC includes two electrodes and a liquid crystal. The alignment of the liquid crystal is changed by the action of an electric field between the two electrodes. One of the two electrodes of the liquid crystal element LC, which is connected to the source line L_Y via the transistor TR, is a pixel electrode, and the other, to which Vcom is applied, is connected to the common line L_com.

The capacitor CAP is connected in parallel to the liquid crystal element LC. Here, one electrode of the capacitor is an electrode connected to a source or a drain of the transistor TR, and the other electrode of the capacitor is connected to the capacitor line L_cap to which the capacitor line voltage is applied.

<Method for Driving Liquid Crystal Display Device>

Next, the operation of the liquid crystal display device 80, which performs display in the first mode for moving image display and in the second mode for still image display, is described with reference to a timing chart in FIG. 25. FIG. 25 shows the signal waveforms of a vertical synchronization signal (Vsync) and a data signal (Vdata) that is output to the source line L_Y from the source driver 803.

Figure 25:
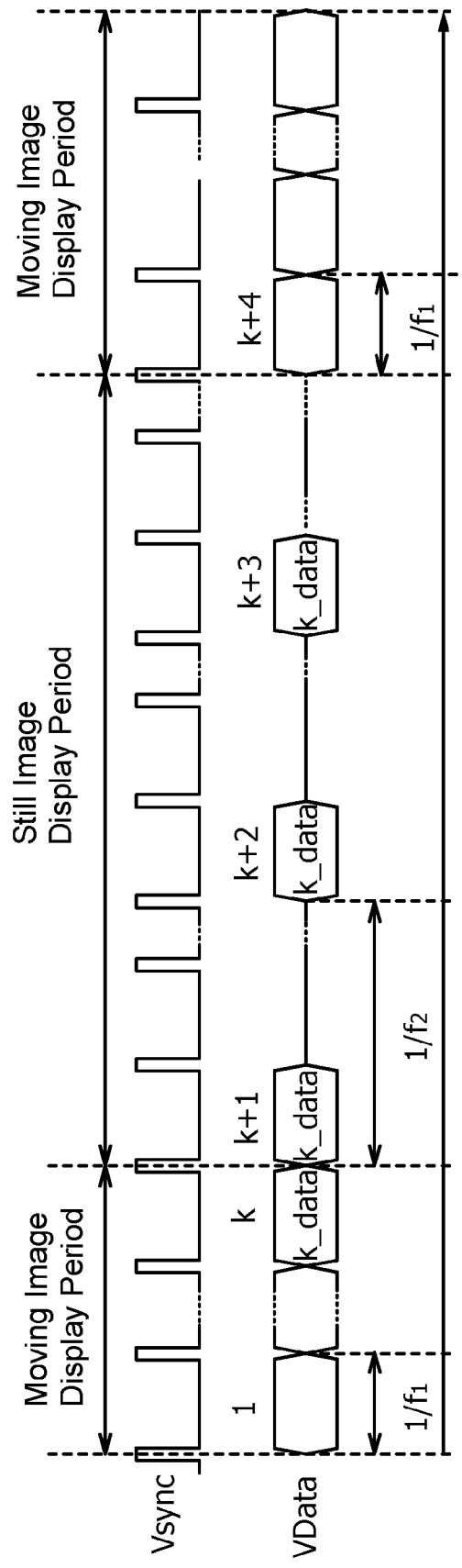
FIG. 25 is a timing chart illustrating operation of a liquid crystal display device.

FIG. 25 is a timing chart of the liquid crystal display device 80. In FIG. 25, for example, moving image display, still image display, and moving image display are performed in that order. Here, there is motion in image data for the first to k-th frames. There is no motion in image data for the (k+1)-th to (k+3)-th frames. There is motion in image data for the (k+4)-th frame and frames after the (k+4)-th frame. Note that k is an integer of 2 or more.

In the first moving image display period, the motion detection portion 811 determines that there is motion in image data for each frame. Accordingly, the liquid crystal display device 80 operates in the first mode. The control circuit 810 outputs image signals (Video) to the source driver 803 at a frame frequency ($f_1$) that is higher than or equal to the frequency of the vertical synchronization signal. The source driver 803 continuously outputs data signals (Vdata) to the source line L_Y. Note that the length of one frame period in the moving image display period is represented by $1/f_1$ (seconds).

Next, in the still image display period, the motion detection portion 811 performs image processing for detecting motion and determines that there is no motion in image data for the (k+1)-th frame. Accordingly, the liquid crystal display device 80 operates in the second mode. The control circuit 810 outputs image signals (Video) to the source driver 803 at a frame frequency ($f_2$) that is lower than the frequency of the vertical synchronization signal. The source driver 803 intermittently outputs data signals (Vdata) to the source line L_Y. Note that the length of one frame period in the still image display period is represented by $1/f_2$ (seconds).

Since the source driver 803 intermittently outputs data signals (Vdata), supply of control signals (e.g., a start pulse signal and a clock signal) to the gate driver 802 and the source driver 803 can also be performed intermittently; thus, the operations of the gate driver 802 and the source driver 803 can be stopped periodically.

The intermittent output of data signals (Vdata) to the source line L_Y in the second mode is specifically described. For example, as shown in FIG. 25, in the (k+1)-th frame, the control circuit 810 outputs control signals to the gate driver 802 and the source driver 803 and outputs image signals (Video) to the source driver 803 at the frame frequency $f_2$. The source driver 803 outputs the data signal (Vdata) written in the previous period, that is, the data signal (Vdata) output to the source line L_Y in the k-th frame, to the source line L_Y. In this manner, in the still image display period, the data signal (Vdata) written in the previous period is repeatedly written in the source line L_Y every $1/f_2$ seconds. Thus, a voltage corresponding to a gray level of an image signal for the same image can be written in (i.e., refresh operation can be performed). The periodic refresh operation can reduce flickers due to shift of gray levels caused by a voltage drop and can improve the display quality of the liquid crystal display device.

The control circuit 810 operates in the second mode until the motion detection portion 811 determines that there is motion in image data or until a sensor signal is input.

Then, when the motion detection portion 811 determines that there is motion in image data for the (k+4)-th frame and frames after the (k+4)-th frame, the liquid crystal display device 80 operates in the first mode again. The control circuit 810 outputs image signals (Video) to the source driver 803 at a frame frequency ($f_1$) that is higher than or equal to the frequency of the vertical synchronization signal. The source driver 803 continuously outputs data signals (Vdata) to the source line L_Y.

As described above, in the display device of one embodiment of the present invention, the touch sensor is provided in the touch sensor portion on the second substrate side, and the color filter is provided in the display element portion on the first substrate side. Such a structure enables the touch sensor portion of the display device to be driven concurrently with the display element portion; thus, even in the case where frame frequencies are varied in the display element portion (e.g., the case where operation is switched between the first mode for moving image display and the second mode for still image display), a touch sensing period in the touch sensor portion can be secured while display quality is maintained.

This embodiment can be combined with any of the other embodiments in this specification as appropriate.

Embodiment 7

In this embodiment, application examples of the display device described in the above embodiment to a display module and to an electronic device including the display module will be described with reference to FIG. 26, FIGS. 27A to 27H, and FIGS. 28A to 28H.

A display module which can be used for a display device of one embodiment of the present invention is described with reference to FIG. 26.

Figure 26:
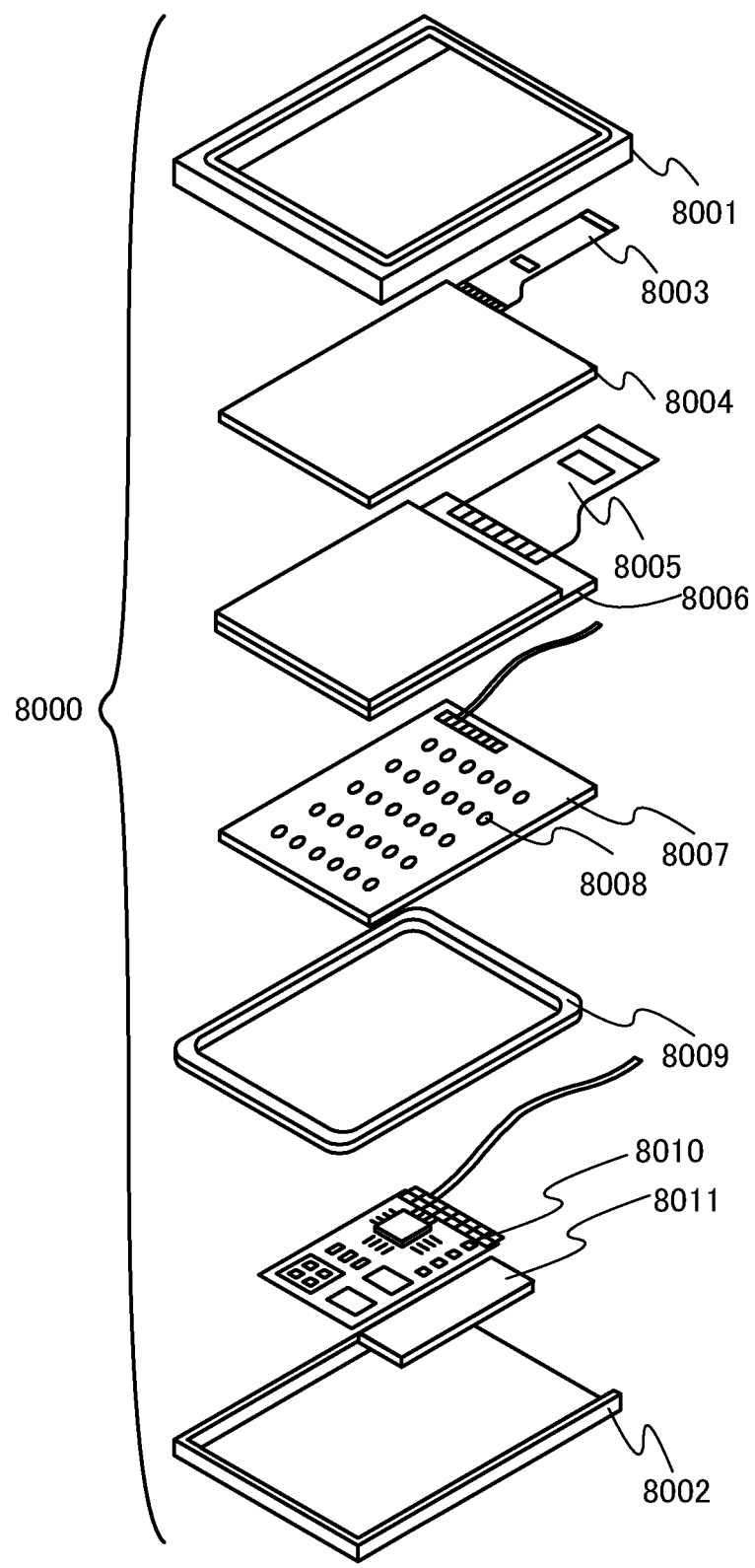
FIG. 26 illustrates a display module including a display device of one embodiment of the present invention.

In a display module 8000 in FIG. 26, a touch sensor portion 8004 connected to an FPC 8003, a display element portion 8006 connected to an FPC 8005, a backlight unit 8007, a frame 8009, a printed board 8010, and a battery 8011 are provided between an upper cover 8001 and a lower cover 8002.

The shapes and sizes of the upper cover 8001 and the lower cover 8002 can be changed as appropriate in accordance with the sizes of the touch sensor portion 8004 and the display element portion 8006. In addition, a cover glass portion can be provided on the front of the display module 8000.

The touch sensor portion 8004 can be a resistive touch panel or a capacitive touch panel that overlaps with the display element portion 8006. Alternatively, a counter substrate (sealing substrate) of the display element portion 8006 can have a touch panel function. A photosensor may be provided in each pixel of the display element portion 8006 to form an optical touch panel.

The backlight unit 8007 includes a light source 8008. The light source 8008 may be provided at an end portion of the backlight unit 8007 and a light diffusing plate may be used.

The frame 8009 protects the display element portion 8006 and also functions as an electromagnetic shield for blocking electromagnetic waves generated by the operation of the printed board 8010. The frame 8009 may function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

The display module described above includes the display device described in the above embodiment. Thus, the display module can achieve low power consumption, high reliability, and high touch sensitivity.

Examples of electronic devices will be described.

FIGS. 27A to 27H and FIGS. 28A to 28D each illustrate an electronic device. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 27A:
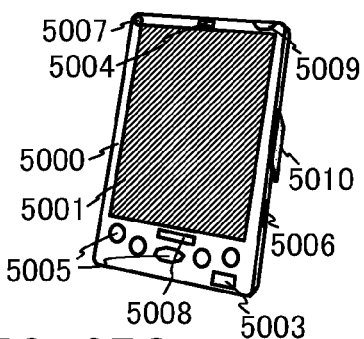
FIGS. 27A to 27H each illustrate an electronic device including a display device of one embodiment of the present invention.
Figure 27B:
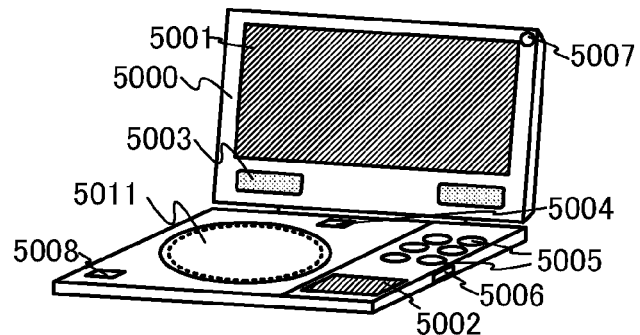
Figure 27C:
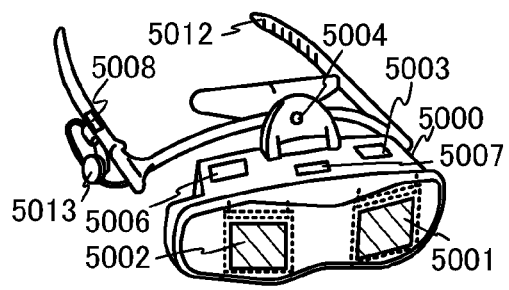
Figure 27D:
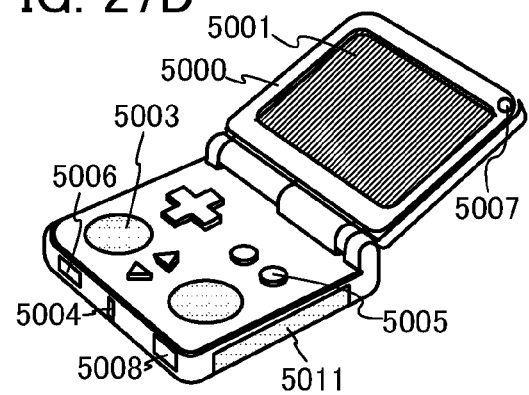
Figure 27E:
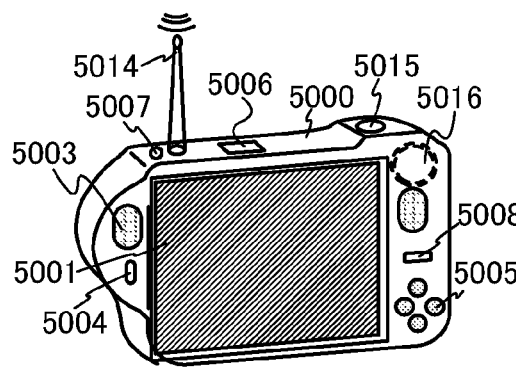
Figure 27F:
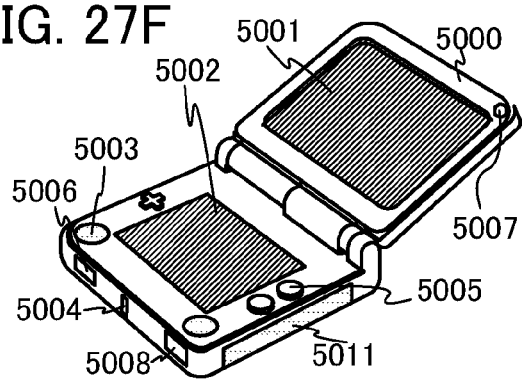
Figure 27G:
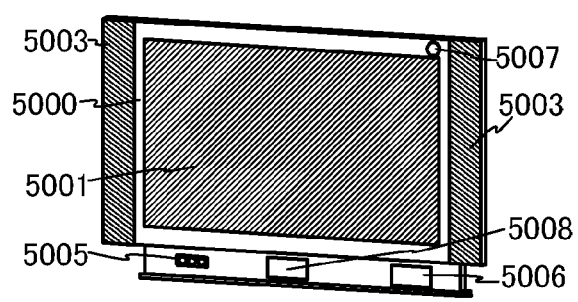
Figure 27H:
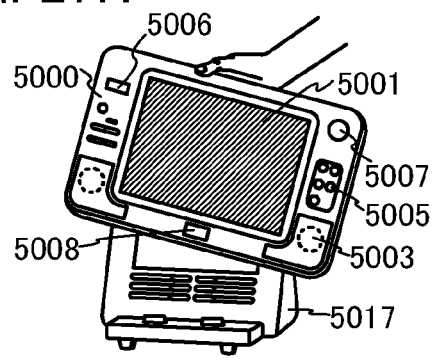
Figure 28A:
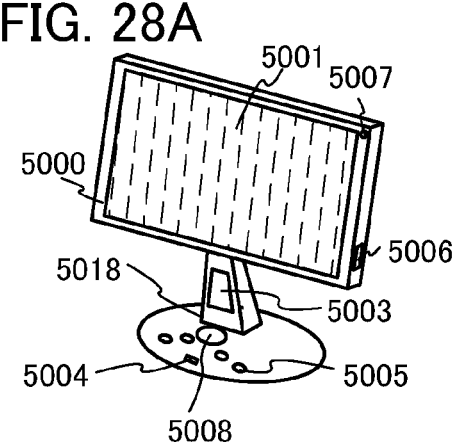
FIGS. 28A to 28H each illustrate an electronic device including a display device of one embodiment of the present invention.
Figure 28B:
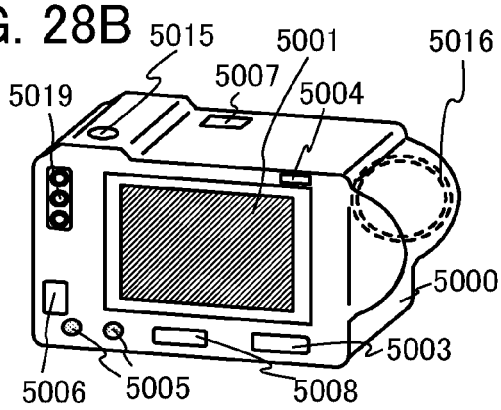
Figure 28C:
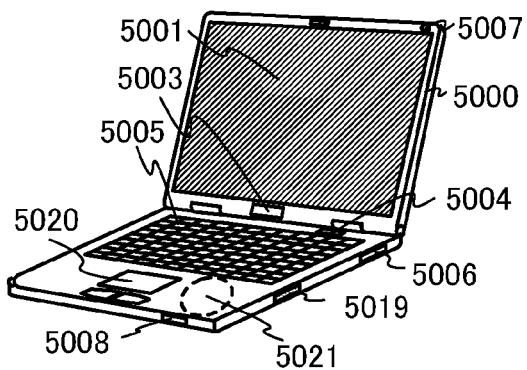
Figure 28D:
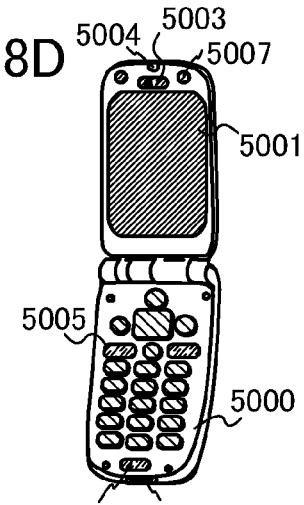

FIG. 27A illustrates a mobile computer which can include a switch 5009, an infrared port 5010, and the like in addition to the above components. FIG. 27B illustrates a portable image reproducing device (e.g., a DVD player) which is provided with a memory medium and can include a second display portion 5002, a memory medium reading portion 5011, and the like in addition to the above components. FIG. 27C illustrates a goggle-type display which can include the second display portion 5002, a supporting portion 5012, an earphone 5013, and the like in addition to the above components. FIG. 27D illustrates a portable game machine which can include the memory medium reading portion 5011 and the like in addition to the above components. FIG. 27E illustrates a digital camera which has a television reception function and can include an antenna 5014, a shutter button 5015, an image receiving portion 5016, and the like in addition to the above components. FIG. 27F illustrates a portable game machine which can include the second display portion 5002, the memory medium reading portion 5011, and the like in addition to the above components. FIG. 27G illustrates a television receiver which can include a tuner, an image processing portion, and the like in addition to the above components. FIG. 27H illustrates a portable television receiver which can include a charger 5017 capable of transmitting and receiving signals, and the like in addition to the above components. FIG. 28A illustrates a display which can include a support base 5018 and the like in addition to the above components. FIG. 28B illustrates a camera which can include an external connection port 5019, a shutter button 5015, an image reception portion 5016, and the like in addition to the above components. FIG. 28C illustrates a computer which can include a pointing device 5020, the external connection port 5019, a reader/writer 5021, and the like in addition to the above components. FIG. 28D illustrates a mobile phone which can include a transmitter, a receiver, a tuner of one-segment partial reception service for mobile phones and mobile terminals, and the like in addition to the above components.

The electronic devices illustrated in FIGS. 27A to 27H and FIGS. 28A to 28D can have a variety of functions. For example, a function of displaying a variety of data (a still image, a moving image, a text image, and the like) on a display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on a display portion, and the like can be given. Further, the electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an image receiving portion can have a function of shooting a still image, a function of taking a moving image, a function of automatically or manually correcting a shot image, a function of storing a shot image in a memory medium (an external memory medium or a memory medium incorporated in the camera), a function of displaying a shot image on the display portion, or the like. Note that functions which can be provided for the electronic devices illustrated in FIGS. 27A to 27H and FIGS. 28A to 28D are not limited to those described above, and the electronic devices can have a variety of functions.

The electronic devices described in this embodiment each include the display portion for displaying some sort of data.

Next, applications of a display device will be described.

Figure 28E:
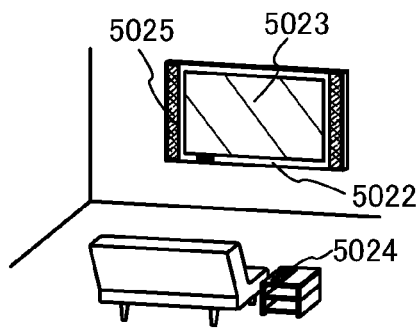

FIG. 28E illustrates an example in which a display device is incorporated in a building. FIG. 28E illustrates a housing 5022, a display portion 5023, a remote controller 5024 which is an operation portion, a speaker 5025, and the like. The display device is incorporated in the building as a wall-hanging type, so that the display device can be provided without requiring a wide space.

Figure 28F:
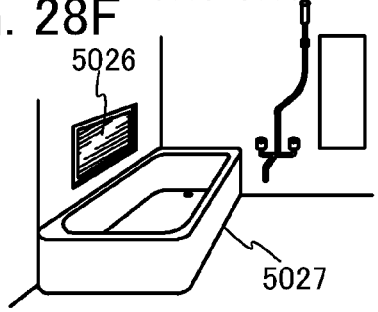

FIG. 28F illustrates another example in which a display device is incorporated in a building. A display module 5026 is incorporated in a prefabricated bath unit 5027, so that a bather can view the display module 5026.

Note that although the wall and the prefabricated bath are taken as examples of the building in this embodiment, one embodiment of the present invention is not limited thereto and a display device can be provided in any of a variety of buildings.

Next, examples in which a display device is incorporated in a moving object will be described.

Figure 28G:
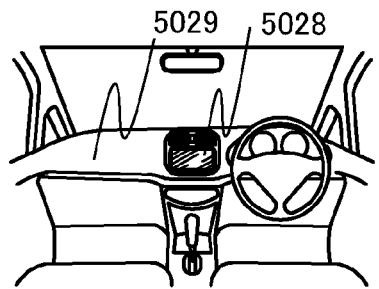

FIG. 28G illustrates an example in which a display device is provided in a vehicle. A display module 5028 is provided in a body 5029 of a vehicle and can display data on the operation of the body or data input from inside or outside of the body on demand. Note that a navigation function may be provided.

Figure 28H:
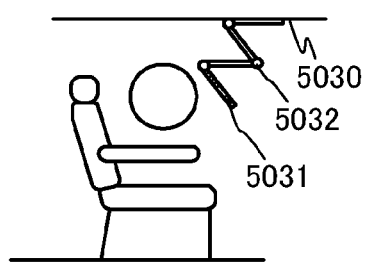

FIG. 28H illustrates an example in which a display device is incorporated in a passenger airplane. FIG. 28H illustrates a usage pattern when a display module 5031 is provided for a ceiling 5030 above a seat of the passenger airplane. The display module 5031 is attached to the ceiling 5030 with a hinge portion 5032, and a passenger can watch the display module 5031 by stretching the hinge portion 5032. The display module 5031 has a function of displaying data when operated by a passenger.

Note that although the body of the vehicle and the body of the airplane are taken as examples of the moving object, one embodiment of the present invention is not limited thereto. A display device can be provided for a variety of moving objects such as a two-wheel vehicle, a four-wheel vehicle (including an automobile and a bus), a train (including a monorail train and a railway train), and a ship.

Note that in this specification and the like, part of a diagram or a text described in one embodiment can be taken out to constitute one embodiment of the invention. Thus, in the case where a diagram or a text related to a certain part is described, a content taken out from the diagram or the text of the certain part is also disclosed as one embodiment of the invention and can constitute one embodiment of the invention. Therefore, for example, part of a diagram or a text including one or more of active elements (e.g., transistors and diodes), wirings, passive elements (e.g., capacitors and resistors), conductive layers, insulating layers, semiconductor layers, organic materials, inorganic materials, components, devices, operating methods, manufacturing methods, and the like can be taken out to constitute one embodiment of the invention. For example, M circuit elements (e.g., transistors or capacitors) (M is an integer) are picked up from a circuit diagram in which N circuit elements (e.g., transistors or capacitors) (N is an integer, where M<N) are provided, whereby one embodiment of the invention can be constituted. As another example, M layers (M is an integer) are picked up from a cross-sectional view in which N layers (N is an integer, where M<N) are provided, whereby one embodiment of the invention can be constituted. As another example, M elements (M is an integer) are picked up from a flow chart in which N elements (N is an integer, where M<N) are provided, whereby one embodiment of the invention can be constituted.

Note that, in the case where at least one specific example is illustrated in a diagram or a text described in one embodiment in this specification and the like, it will be readily appreciated by those skilled in the art that a broader concept of the specific example can be derived. Therefore, in the case where at least one specific example is illustrated in the diagram or the text described in one embodiment, a broader concept of the specific example is disclosed as one embodiment of the invention and can constitute one embodiment of the invention.

Note that, in this specification and the like, a content illustrated in at least a diagram (which may be part of the diagram) is disclosed as one embodiment of the invention and can constitute one embodiment of the invention. Therefore, when a certain content is illustrated in a diagram, the content is disclosed as one embodiment of the invention even without text description and can constitute one embodiment of the invention. Similarly, a diagram obtained by taking out part of a diagram is disclosed as one embodiment of the invention and can constitute one embodiment of the invention.

This application is based on Japanese Patent Application serial no. 2013-032751 filed with Japan Patent Office on Feb. 22, 2013, the entire contents of which are hereby incorporated by reference.

What is claimed is:

1. A display device comprising:
   a transistor over a first substrate;
   a first insulating film over the transistor;
   a color filter over the first insulating film;
   a second insulating film over the color filter;
   a pixel electrode over the second insulating film, the pixel electrode being electrically connected to a terminal of the transistor;
   a liquid crystal layer over the pixel electrode;
   an alignment film over the liquid crystal layer;
   a second substrate over the alignment film;
   a first electrode, a second electrode, and a third electrode over the second substrate;
   a third insulating layer over the first electrode, the second electrode, and the third electrode; and
   a fourth electrode over the insulating layer,
   wherein the first electrode is electrically connected to the second electrode through the fourth electrode,
   wherein the third electrode is electrically isolated from the first electrode, the second electrode, and the fourth electrode, and
   wherein the alignment film is in contact with a first surface of the second substrate, and the first electrode, the second electrode, and the third electrode are in contact with a second surface of the second substrate.

2. The display device according to claim 1,
   wherein a channel formation region of the transistor comprises an oxide semiconductor.

3. The display device according to claim 1,
   wherein a black matrix is in contact with the pixel electrode.

4. A display device comprising:
   a transistor over a first substrate;
   a first insulating film over the transistor;
   a color filter over the first insulating film;
   a second insulating film over the color filter;
   a pixel electrode and a common electrode over the second insulating film, the pixel electrode being electrically connected to a terminal of the transistor;
   a liquid crystal layer over the pixel electrode and the common electrode;
   an alignment film over the liquid crystal layer;
   a second substrate over the alignment film;
   a first electrode, a second electrode, and a third electrode over the second substrate;
   a third insulating layer over the first electrode, the second electrode, and the third electrode; and
   a fourth electrode over the insulating layer, wherein the first electrode is electrically connected to the second electrode through the fourth electrode, wherein the third electrode is electrically isolated from the first electrode, the second electrode, and the fourth electrode, and wherein the alignment film is in contact with a first surface of the second substrate, and the first electrode, the second electrode, and the third electrode are in contact with a second surface of the second substrate.

5. The display device according to claim 4,
wherein a channel formation region of the transistor comprises an oxide semiconductor.

6. The display device according to claim 4,
wherein a black matrix is in contact with the pixel electrode.

* * * * *